(12) United States Patent
Li

(10) Patent No.: US 12,202,491 B1
(45) Date of Patent: Jan. 21, 2025

(54) ELECTRONIC TAG DEVICE

(71) Applicant: Bing Xuan Li, Hsinchu (TW)

(72) Inventor: Bing Xuan Li, Hsinchu (TW)

( * ) Notice: Subject to any disclaimer, the term of this patent is extended or adjusted under 35 U.S.C. 154(b) by 0 days.

(21) Appl. No.: 18/772,144

(22) Filed: Jul. 13, 2024

(51) Int. Cl.
  *B60W 40/13* (2012.01)
  *G06K 19/07* (2006.01)

(52) U.S. Cl.
  CPC .......... *B60W 40/13* (2013.01); *G06K 19/0723* (2013.01); *B60W 2756/10* (2020.02)

(58) Field of Classification Search
  CPC .............. B60W 40/13; B60W 2756/10; G06K 19/0723
  See application file for complete search history.

(56) References Cited

U.S. PATENT DOCUMENTS

| | | | | |
|---|---|---|---|---|
| 10,186,329 B1 * | 1/2019 | LaBorde | ................. | G06N 3/084 |
| 11,640,511 B1 * | 5/2023 | Li | ....................... | G06K 19/0724 |
| | | | | 235/492 |
| 11,758,392 B1 * | 9/2023 | Li | ....................... | G07C 5/0841 |
| | | | | 701/29.1 |
| 11,995,492 B1 * | 5/2024 | Li | ..................... | G06K 19/07707 |
| 2002/0027499 A1 * | 3/2002 | Chainer | ................. | G07C 5/085 |
| | | | | 340/901 |
| 2014/0205155 A1 * | 7/2014 | Chung | ................... | G06V 40/10 |
| | | | | 382/115 |
| 2014/0207629 A1 * | 7/2014 | Bradley | .................. | B60R 25/00 |
| | | | | 705/28 |
| 2014/0229387 A1 * | 8/2014 | Chow | ................ | G06Q 20/3829 |
| | | | | 705/71 |
| 2014/0310074 A1 * | 10/2014 | Gravelle | ................... | G08G 1/20 |
| | | | | 705/13 |
| 2015/0195765 A1 * | 7/2015 | Bhardwaj | ............. | H04W 40/02 |
| | | | | 370/338 |
| 2017/0221069 A1 * | 8/2017 | Remboski | ............ | G07C 5/0825 |
| 2017/0272125 A1 * | 9/2017 | Friedman | ........... | G06K 7/10316 |

(Continued)

FOREIGN PATENT DOCUMENTS

| | | | | |
|---|---|---|---|---|
| CA | 3153054 A1 * | 12/2021 | ........... | B65G 1/1375 |
| CN | 101813703 A * | 8/2010 | ............. | B65D 90/00 |

(Continued)

OTHER PUBLICATIONS

FR-3030824-A1 translation (Year: 2016).*

(Continued)

*Primary Examiner* — Kyle T Johnson
(74) *Attorney, Agent, or Firm* — Hemisphere Law, PLLC; Zhigang Ma

(57) ABSTRACT

An electronic tag device includes: a processor and a radio frequency identification (RFID) tag chip; the processor is configured to acquire detection signals from a vehicle and process the detection signals to obtain current load information of the vehicle; and the processor is further configured to convert a data format of the current load information of the vehicle to obtain the converted load information meeting ISO18000-6C of the vehicle; and the RFID tag chip is configured to obtain and store the converted load information meeting ISO18000-6C of the vehicle from the processor to thereby allow a server to obtain the converted load information meeting ISO18000-6C of the vehicle from the RFID tag chip. The electronic tag device can be used in the variety of application scenes.

20 Claims, 9 Drawing Sheets

(56) References Cited

U.S. PATENT DOCUMENTS

| | | | | |
|---|---|---|---|---|
| 2017/0323412 A1* | 11/2017 | Muirhead | ............ | G06F 16/258 |
| 2018/0373236 A1* | 12/2018 | Ewert | .................. | G08G 1/017 |
| 2019/0188761 A1* | 6/2019 | Dheedene | ............. | G06Q 50/40 |
| 2020/0082396 A1* | 3/2020 | Chow | ................ | G06Q 20/1085 |
| 2020/0344602 A1* | 10/2020 | Li | ........................ | H04L 67/125 |
| 2021/0009310 A1* | 1/2021 | Moeller | ........... | G06K 19/07786 |
| 2022/0104636 A1* | 4/2022 | Chila | .................... | G16H 40/40 |

FOREIGN PATENT DOCUMENTS

| | | | | | |
|---|---|---|---|---|---|
| CN | 113763720 | A | * | 12/2021 | |
| CN | 115860019 | A | * | 3/2023 | |
| FR | 3030824 | A1 | * | 6/2016 | ........... B42D 25/305 |
| KR | 100244788 | B1 | * | 3/2000 | |

OTHER PUBLICATIONS

KR-100244788-B1 translation (Year: 2000).*
CN-113763720-A translation (Year: 2021).*
CN-101813703-A translation (Year: 2010).*
CN-115860019-A translation (Year: 2023).*

* cited by examiner

ELECTRONIC TAG DEVICE

TECHNICAL FIELD

The disclosure relates to the field of electronic tag communication technologies, and more particularly to an electronic tag device.

BACKGROUND

At present, with the increasing demand for logistics, a requirement for transportation management has also increased. Truck transportation and management, as one of the main modes of the logistics, is particularly important. However, there are many problems in current truck transportation process, for example: a long queue time of trucks at weighing stations of the highway leads to low transportation efficiency; in order to reduce costs, some trucks transfer goods to one truck after passing through the weighing station, resulting in overloaded transportation, which increases road losses and driving risks; and the lack of effective monitoring measures by the management department makes it difficult to detect and handle overloaded trucks in a timely manner, which affects the supervision and management of truck weight.

Radio frequency identification (RFID) technology is a technology that identifies specific targets and reads relevant data through radio signals, and its identification work does not require manual intervention and can work in various harsh environments. In recent years, with the rapid development of Internet of Things (IoT), intelligent manufacturing, intelligent retail and other fields, RFID electronic tags have been widely used and gradually become an important force in promoting industrial digital upgrading. Compared to traditional barcode recognition technology, the RFID electronic tags have many advantages, such as waterproof, antimagnetic, high temperature resistant, long service life, large reading distance, data on the tag can be encrypted, larger storage capacity, free change of storage information. Therefore, combining the RFID electronic tags with truck transportation and management is an effective means to solve the problems in the truck transportation process.

However, existing RFID electronic tags are mostly used in truck transportation management to achieve the toll collection without stopping when driving on the freeway, but they lack real-time monitoring of truck weight information. Therefore, it is urgent to design an electronic tag device to realize real-time monitoring of the truck weight information, to improve efficiency of the truck transportation management.

SUMMARY

The disclosure provides an electronic tag device, the electronic tag device can be connected to a vehicle, thereby obtaining detection signals from the vehicle, and the electronic tag device can obtain current load information of the vehicle according to the detection signals. Therefore, the electronic tag device can realize real-time monitoring of the load information of the vehicle, to thereby solve the problems in the related art.

In an embodiment, the disclosure provides an electronic tag device including: a processor and an RFID tag chip, connected to the processor;

the processor is configured (i.e., structured and arranged) to acquire detection signals from a vehicle and process the detection signals to obtain current load information of the vehicle; and the processor is further configured to convert a data format of the current load information of the vehicle to obtain the converted load information meeting ISO18000-6C of the vehicle; and the RFID tag chip is configured to obtain and store the converted load information meeting ISO18000-6C of the vehicle from the processor to thereby allow a first server to obtain the converted load information meeting ISO18000-6C of the vehicle from the RFID tag chip.

In an embodiment, the electronic tag device further includes: a cellular communication circuit, connected to the processor and configured to wirelessly connect a second server;

the processor is configured to transmit the current load information to the cellular communication circuit to thereby allow the second server to obtain the current load information from the cellular communication circuit.

In an embodiment, the cellular communication circuit is further configured to process the current load information to obtain processed current load information, and transmit the processed current load information to the second server.

In an embodiment, the cellular communication circuit is specifically configured to receive the current load information of the vehicle, encrypt the current load information of the vehicle, and wirelessly transmit the encrypted current load information of the vehicle to the second server.

In an embodiment, the electronic tag device further includes: a wireless data transmission circuit, connected to the processor and configured to wirelessly connect an electronic device;

the processor is further configured to wirelessly transmit the current load information of the vehicle to the wireless data transmission circuit to thereby allow the electronic device to display the current load information of the vehicle.

In an embodiment, the wireless data transmission circuit is further configured to process the current load information to obtain the processed current load information, and transmit the processed current load information to the electronic device.

In an embodiment, the wireless data transmission circuit is specifically configured to receive the current load information of the vehicle, encrypt the current load information of the vehicle, and wirelessly transmit the encrypted current load information of the vehicle to the electronic device.

In an embodiment, the cellular communication circuit is configured to wirelessly receive an unloading instruction from the second server, and transmit the unloading instruction to the processor;

the processor is configured to obtain an amount of weight to be unloaded according to the unloading instruction, and transmit the amount of weight to be unloaded to the wireless data transmission circuit; and the wireless data transmission circuit is configured to wirelessly transmit the amount of weight to be unloaded to the electronic device to thereby enable a user to unload goods corresponding to the amount of weight to be unloaded.

In an embodiment, the electronic tag device further includes: a positioning circuit, connected to the cellular communication circuit and configured to obtain current positional data of the electronic tag device and transmit the current positional data to the cellular communication circuit;

the cellular communication circuit is further configured to receive the current positional data, wirelessly transmit the current positional data to the second server to thereby enable the second server to output the unloading instruction in response to a current geographical region where the electronic tag device is located determined by the current positional data being a target delivery point.

In an embodiment, after the user unloads the goods corresponding to the amount of weight to be unloaded, the processor is further configured to acquire updated detection signals from the vehicle, process the updated detection signals to obtain updated load information of the vehicle, and convert a data format of the updated load information of the vehicle to obtain updated load information meeting ISO18000-6C of the vehicle; the RFID tag chip is further configured to obtain and store the updated load information meeting ISO18000-6C of the vehicle from the processor to thereby allow the first server to obtain the updated load information meeting ISO18000-6C of the vehicle from the RFID tag chip.

In an embodiment, the cellular communication circuit is configured to wirelessly receive an unloading instruction from the second server, and transmit the unloading instruction to the processor;

the processor is configured to receive the unloading instruction from the cellular communication circuit to obtain an amount of weight to be unloaded and positional data of a delivery point, and transmit the amount of weight to be unloaded and the positional data of the delivery point to the wireless data transmission circuit; and the wireless data transmission circuit is configured to wirelessly transmit the amount of weight to be unloaded and the positional data of the delivery point to the electronic device, to thereby enable a user to unload goods corresponding to the amount of weight to be unloaded when the vehicle arrives the delivery point.

In an embodiment, the electronic tag device further includes: a memory, connected to the processor; and the wireless data transmission circuit is further configured to receive BLUETOOTH® data from the electronic device, convert the BLUETOOTH® data, and transmit the converted BLUETOOTH® data to the processor; and the processor is configured to store the converted BLUETOOTH® data into the memory.

In an embodiment, the wireless data transmission circuit is further configured to receive wireless fidelity (WIFI) data from the electronic device, convert the WIFI data, and transmit the converted WIFI data to the processor; and the processor is configured to store the converted WIFI data into the memory.

In an embodiment, the electronic tag device further includes: a cellular communication circuit, connected to the processor and configured to wirelessly connect a third server; a memory, connected to the processor and configured to store multiple sets of tag data corresponding to different geographic regions; and a positioning circuit, connected to the cellular communication circuit;

the positioning circuit is configured to obtain current positional data of the electronic tag device and transmit the current positional data to the cellular communication circuit;

the cellular communication circuit is configured to receive the current positional data, wirelessly transmit the current positional data to the third server to thereby enable the third server to output a tag data updating instruction in response to a current geographical region where the electronic tag device is located determined by the current positional data is different from a previously determined geographical region, wirelessly receive the tag data updating instruction from the third server, and transmit the tag data updating instruction to the processor; and the processor is further configured to obtain a target set of tag data corresponding to the tag data updating instruction from the multiple sets of tag data stored in the memory and transmit the target set of tag data to the RFID tag chip for tag data updating.

In an embodiment, each set of the multiple sets of tag data includes: an electronic product code (EPC) and a tag identifier (TID), and the TIDs of the multiple sets of tag data comprise multiple account information corresponding to the different geographical regions respectively, and the TID of the target set of tag data comprises one of the multiple account information corresponding to the current geographical region being one of the different geographical regions.

In an embodiment, the electronic tag device further includes: an on-board diagnostics (OBD) circuit, connected to the processor;

the processor is configured to transmit an OBD data request command set to an OBD interface of the vehicle through the OBD circuit to thereby enable the vehicle to output OBD data in response to the OBD data request command set; and the processor is further configured to obtain first target OBD data based on the OBD data obtained from the OBD interface through the OBD circuit and convert a data format of the first target OBD data to obtain the converted first target OBD data meeting ISO18000-6C; and the OBD data comprises: static data including vehicle identification number (VIN), and dynamic data including at least one of a fuel tank level, odometer data and vehicle exhaust emission parameters; and the RFID tag chip is configured to obtain and store the converted first target OBD data meeting ISO18000-6C from the processor to thereby allow a monitoring server to obtain the converted first target OBD data meeting ISO18000-6C from the RFID tag chip.

In an embodiment, the electronic tag device further includes: a cellular communication circuit, connected to the processor and configured to wirelessly connect a second server;

the processor is further configured to obtain second target OBD data based on the OBD data obtained from the OBD interface through the OBD circuit, and transmit the second target OBD data to the cellular communication circuit to thereby allow the second server to obtain the second target OBD data from the cellular communication circuit.

In an embodiment, the electronic tag device further includes: a wireless data transmission circuit, connected to the processor and configured to wirelessly connect an electronic device; and the processor is further configured to obtain third target OBD data based on the OBD data obtained from the OBD interface through the OBD circuit, and transmit the third target OBD data to the wireless data transmission circuit to thereby allow the electronic device to obtain the third target OBD data from the wireless data transmission circuit and display the third target OBD data.

In an embodiment, the electronic tag device further includes: a power management circuit, connected to the processor; a universal serial bus (USB) interface, connected to the processor and configured to connect a first power supply; a detection signal receive interface, connected to processor and configured to receive the detection signals from the vehicle; a power input interface, connected to the power management circuit and configured to connect a second power supply; and the detection signal receive interface, the power input interface and the USB interface are located at a same side of the electronic tag device.

In an embodiment, the electronic tag device further includes: a subscriber identity module (SIM) interface, connected to the processor; and a SIM slot, connected to the SIM interface and configured to connect a SIM card.

Beneficial effects of the disclosure are as follows.

In the disclosure, an electronic tag device is provided, and the processor of the electronic tag device can acquire the detection signals of the vehicle, and process the detection signals to obtain the current load information of the vehicle. Thus, the electronic tag device of the disclosure can obtain the load information of the vehicle in real time or periodically, which greatly facilitates the monitoring and management of the transportation process of goods.

Specifically, the processor of the electronic tag device can convert the data format of the current load information of the vehicle to obtain converted load information meeting ISO18000-6C of the vehicle, the RFID tag chip can obtain and store the converted load information meeting ISO18000-6C of the vehicle from the processor, the server can obtain the converted load information meeting ISO18000-6C of the vehicle, the server may be an authenticated server by relevant departments such as FHWA and state department of transportation (DOT) in United States of America (USA). The authenticated server can obtain the converted load information meeting ISO18000-6C of the vehicle based on the RFID tag chip, so that the relevant departments such as FHWA and the state DOT can quickly and accurately obtain the load information of the vehicle to check whether the vehicle is overweight in time, thus effectively avoiding the overload vehicle driving on the highway, reducing the damage to the road and reducing the risk of traffic accidents, and improving efficiency of vehicle transportation and management. Meanwhile, truck drivers no longer need to drive trucks in line at the weighing station, which significantly reduces the waiting time and improves the transportation efficiency of the goods. Therefore, the electronic tag device of the disclosure significantly improves the efficiency of vehicle supervision and management by the relevant departments.

Moreover, the processor of the electronic tag device can wirelessly transmit the current load information of the vehicle to the server through the cellular communication circuit, and the server can be an enterprise server. In the logistics company, when a vehicle driver e.g., a truck driver drives the truck disposed with the electronic tag device, the logistics company can monitor and manage the load of the vehicle in real time, for example, each delivery point and the amount of weight need to be loaded can be managed, so as to better manage the transportation process of the goods. The electronic tag device further includes the wireless data transmission circuit, and the wireless data transmission circuit is connected to the electronic device, so that the driver can view the relevant information of the vehicle and receive the instructions sent from the logistics company. For example, the logistics company can send the unloading instruction through the enterprise server, the processor can receive the unloading instruction through the cellular communication circuit, obtain the amount of weight to be unloaded according to the unloading instruction, and transmit the amount of weight to be unloaded to the electronic device through the wireless data transmission circuit, so that the driver can know the amount of weight to be unloaded, to thereby unload corresponding weight of the goods. Therefore, the electronic tag device of the disclosure further optimizes the efficiency of the logistics company in managing goods transportation and reduces operating costs.

In addition, the electronic tag device is provided with the OBD circuit for connecting the OBD interface of the vehicle, the OBD circuit of the electronic tag device can obtain the OBD data from the vehicle, and the processor can obtain the target OBD data based on the OBD data obtained from the vehicle, therefore the electronic tag device is not only used for the toll collection without stopping, but also can be used in the variety of application scenes because the OBD data can be obtained. In an application scene, the processor of the electronic tag device can convert the target OBD data, the RFID tag chip can store the converted target OBD data, the server can obtain the converted target OBD data through the RFID tag chip, the server may be the authenticated electronic toll collection (ETC) server and the converted target OBD data may include vehicle exhaust data, the authenticated ETC server can obtain the vehicle exhaust data from the RFID tag chip, therefore it is convenient for relevant departments such as traffic management department or environmental protection department to monitor the carbon emissions of the vehicles, and it is beneficial for the relevant departments to manage vehicles. In another application scene, the target OBD data may include vehicle basic parameters such as a fuel consumption, a driving distance, an odometer data, and a fuel tank level; in the logistics company, when a vehicle driver e.g., a truck driver drives the truck disposed with the electronic tag device, the logistics company can know driving conditions of the truck based on the target OBD data, and thus it can avoid the problem of the truck driver stealing fuel such as gasoline on the way, and the transportation cost of the logistics company can be reduced. In a still another application scene, the target OBD data may include vehicle fault diagnosis data, vehicle maintenance personnel can directly obtain the vehicle fault diagnosis data for vehicle fault diagnosis and vehicle maintenance, the operation of obtaining data is simple and efficient. The electronic tag device can obtain the target OBD data based on the OBD data, and output the target OBD data through the RFID tag chip, the cellular communication circuit and/or the wireless data transmission circuit, thereby to meet actual needs, and the application scope of the electronic tag device is wider.

Furthermore, the memory of the electronic tag device can be stored with the multiple sets of tag data corresponding to different geographic regions respectively, the electronic tag device can acquire the positional data in real time or periodically and transmit the positional data to the server, the server output the tag data updating instruction when it determines that the current geographical region where the electronic tag device is located determined by the positional data is different from a previously determined geographical region, i.e., the geographical region of the electronic tag device has changed, the electronic tag device obtain the target set of tag data corresponding to the tag data updating instruction from the multiple sets of tag data to complete tag data updating. Therefore, when the electronic tag device disclosed by the disclosure is disposed on the vehicle, an additional expense for toll settlement caused by an existing electronic tag device of the vehicle being bound with only one account information can be saved. It is conducive to the development of the automobile leasing industry.

In summary, the electronic tag device of the disclosure not only improves the efficiency of goods transportation, but also enhances the convenience and safety of vehicle management, bringing revolutionary progress to the logistics industry.

BRIEF DESCRIPTION OF DRAWINGS

In order to more clearly explain embodiments of the disclosure or the technical schemes in the prior art, the following will briefly introduce the drawings that need to be used in the description of the embodiments or the prior art. It is obvious that the drawings in the following description are only some of the embodiments of the disclosure. For those skilled in the art, other drawings can be obtained according to the structure shown in these drawings without paying creative work.

A realization of purposes, functional characteristics and advantages of the disclosure will be further described with reference to the attached drawings in combination with some embodiments.

DETAILED DESCRIPTION OF EMBODIMENTS

The technical schemes in the embodiments of the disclosure will be clearly and completely described below in combination with the drawings in the embodiments of the disclosure. Apparently, the described embodiments are only some of the embodiments of the disclosure, not all of them. Based on the embodiments in the disclosure, all other embodiments obtained by those skilled in the art without creative work should be within the scope of the disclosure.

In the disclosure, unless specific provisions and limitations, the terms "connect", "dispose" and etc., should be understood in a broad sense. For example, the term "connect" can be directly connected, indirectly connected through an intermediate medium, fixedly connected, a detachably connected, integrated into one, or electrically connected. It can be a connection within two elements or an interactive relationship between the two elements, unless the specific provisions and limitations, for those skilled in the art, the specific meaning of the above terms in the disclosure can be understood according to the specific situation.

In addition, the technical schemes among various embodiments can be combined with one another, but it must be based on the realization of those skilled in the art. When the combination of technical schemes is contradictory or impossible, it should be considered that the combination of technical schemes does not exist and is not within the protection scope of the disclosure.

Figure 1:
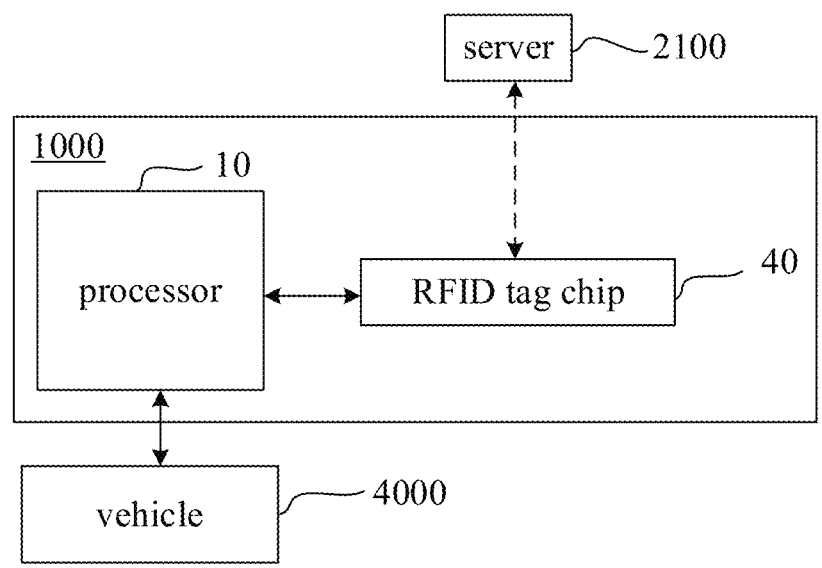
FIG. 1 illustrates a schematic structural diagram of an electronic tag device according to an embodiment of the disclosure.

An embodiment of the disclosure provides an electronic tag device 1000, as shown in FIG. 1, the electronic tag device 1000 includes a processor 10 and a RFID tag chip 40.

Specifically, the RFID tag chip 40 is connected to the processor 10. The processor 10 is configured (i.e., structured and arranged) to acquire detection signals from a vehicle 4000, process the detection signals to obtain current load information of the vehicle 4000, and convert a data format of the current load information of the vehicle 4000 to obtain the converted load information meeting ISO18000-6C of the vehicle 4000. The RFID tag chip 40 is configured to obtain and store the converted load information meeting ISO18000-6C of the vehicle 4000 from the processor 10 to thereby allow a server 2100 to obtain the converted load information meeting ISO18000-6C of the vehicle 4000 from the RFID tag chip 40.

With a rapid development of the economy, a demand for logistics has also increased, and more and more vehicles for transporting goods have emerged on the highway. A vehicle transporting goods usually needs to pass through a weighing station to check and record the current load information of the vehicle before driving on the highway. However, the increase in vehicles leads to longer queue times to pass through the weighing station, which seriously affects the transportation efficiency of the vehicles. Moreover, the weighing station is usually located on a state boundary, in order to avoid penalties for overweight, some vehicles transfer goods to one vehicle after passing through the weighing station, resulting in the vehicle being overloaded, which increases road losses and driving risks.

Based on this, in an embodiment, the processor 10 acquires the detection signals from the vehicle 4000, processes the detection signals to obtain the current load information of the vehicle 4000 and converts a data format of the current load information of the vehicle 4000 to obtain the converted load information meeting ISO18000-6C of the vehicle 4000. The RFID tag chip 40 obtains and stores the converted load information meeting ISO18000-6C of the vehicle 4000 from the processor 10, thus the server 2100 can communicate with the RFID tag chip 40 to obtain the converted load information meeting ISO18000-6C of the vehicle 4000, so that the vehicle 4000 does not need to pass through the weighing station to obtain its load information, which significantly reduces the waiting time and improves the transportation efficiency of the goods. In addition, relevant departments such as FHWA and state DOT can quickly and accurately obtain the load information of the vehicle 4000 to check whether the vehicle is overweight in time, thus effectively avoiding the overloaded vehicle driving on the highway, reducing the damage to the road and reducing the risk of traffic accidents, and improving efficiency of vehicle transportation and management.

In some embodiments, the vehicle 4000 is installed with multiple sensors, such as weight sensors or displacement sensors, the sensors can obtain the detection signals, and transmit the detection signals to the processor 10 through a recommend standard 485 (RS485) cable. The detection signals may be weight signals or displacement signals. Specifically, the detection signals obtained through the sensors are transmitted to a transceiver, and the transceiver transmits the detection signals to the processor 10 through the RS485 cable. The processor 10 is configured to receive the detection signals and calculate the current load information of the vehicle 4000 based on the detection signals by using a math model. For example, the electronic tag device 1000 stores an initial weight of the vehicle 4000 and the math model in advance, and then calculates the load of the vehicle 4000 based on the initial weight and the math model. It is worth mentioning here that it is prior art to calculate the load of the vehicle 4000 based on the detection signals obtained by the sensors, and the disclosure will not be described in detail here.

In an embodiment, the vehicle 4000 is installed with a vehicle load metering device, and the detection signals of the vehicle 4000 can be obtained through the vehicle load metering device. Specifically, the vehicle load metering device refers to the vehicle load metering device disclosed in U.S. Pat. No. 10,996,098 B2; and the vehicle load metering device includes a displacement sensing module, a signal processing/transmission module and a signal receiving/processing module; the displacement sensing module includes multiple displacement sensors respectively mounted on flexible supporting devices of a vehicle suspension system of the vehicle, and each displacement sensor is connected to two supporting boards of the corresponding flexible supporting device to detect displacement amount of the two supporting boards. For more detailed information of the vehicle load metering device used in the disclosure, please refer to the U.S. Pat. No. 10,996,098 B2, which will not be further elaborated here.

Figure 11:
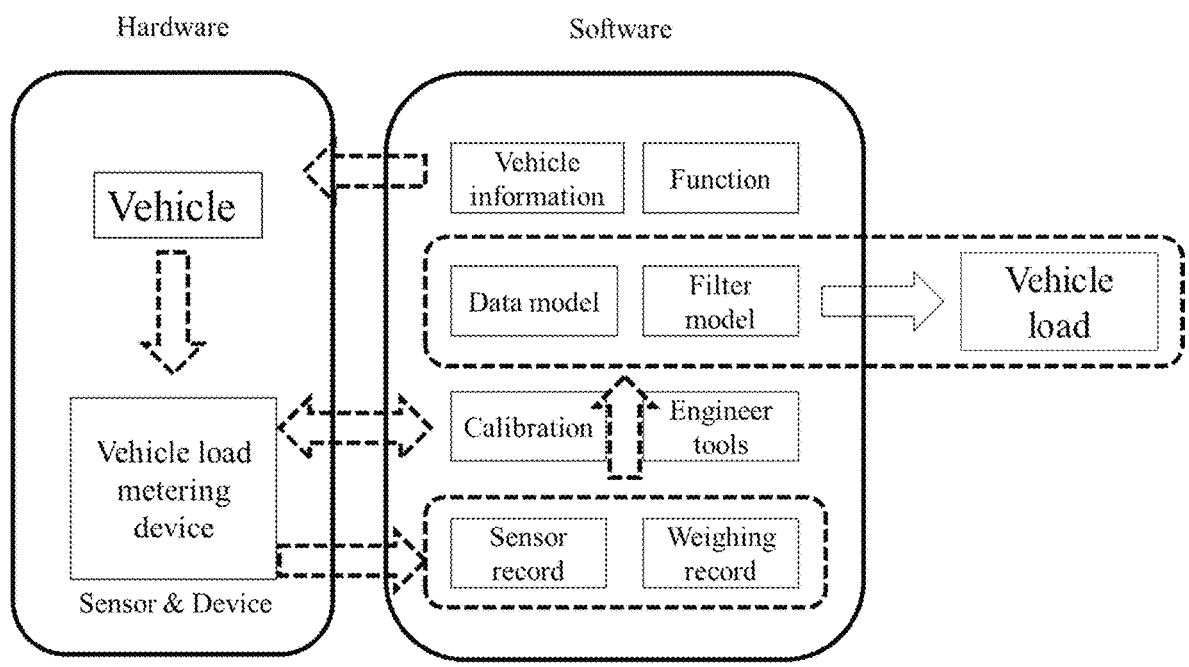
FIG. 11 illustrates a schematic diagram of a data process flow according to an embodiment of the disclosure.

Furthermore, the software for the electronic tag device 1000 to achieve multiple functions include multiple modules, as shown in FIG. 11, the software includes sensor record, weighing record, calibration, engineer tools, data model, filter model, function, and vehicle information. The electronic tag device 1000 can be equipped with the Android™ platform to store vehicle information, have a computational function, have a calibration function, store sensor record and weighing record, have a data model and a filter model, and have engineer tools. As shown in FIG. 11, the data model and the filter model can be used to calculate the vehicle load. The Android™ platform can achieve the purpose of the disclosure.

In some embodiments, the processor 10 is a central processing unit (CPU). Specifically, for example, the processor 10 is an MEDIATEK® quad core processor with an operating frequency of 1.5 gigahertz (GHz), and a model of the processor 10 is MT8765. The disclosure does not limit the processor 10, the foregoing is only for easy understanding. In some embodiments of the disclosure, the processor 10 has the function of data process to obtain the load information.

In some embodiments, the server 2100 is a cloud server. In other embodiments, the server 2100 is a personal server, an enterprise server, or a government server. It should be noted that the disclosure does not limit the type and source of the server 2100. In some embodiments, the server 2100 is an authenticated server by FHWA or the state DOT. It should be noted that the server 2100 obtains the data from the RFID tag chip, which can be understood as indirect communication, i.e., a RFID tag reader is disposed on where needed, and the RFID tag reader can obtain the data from the RFID tag chip and sends it to the server 2100.

In some embodiments, the RFID tag chip 40 is an ISO18000-6C tag chip. Specifically, for example, the RFID tag chip 40 is a Monza® X-8K tag chip. The disclosure does not limit the RFID tag chip 40, the foregoing is only for easy understanding. In some embodiments of the disclosure, the processor 10 has the function of data format conversion to match the RFID tag chip 40.

Figure 2:
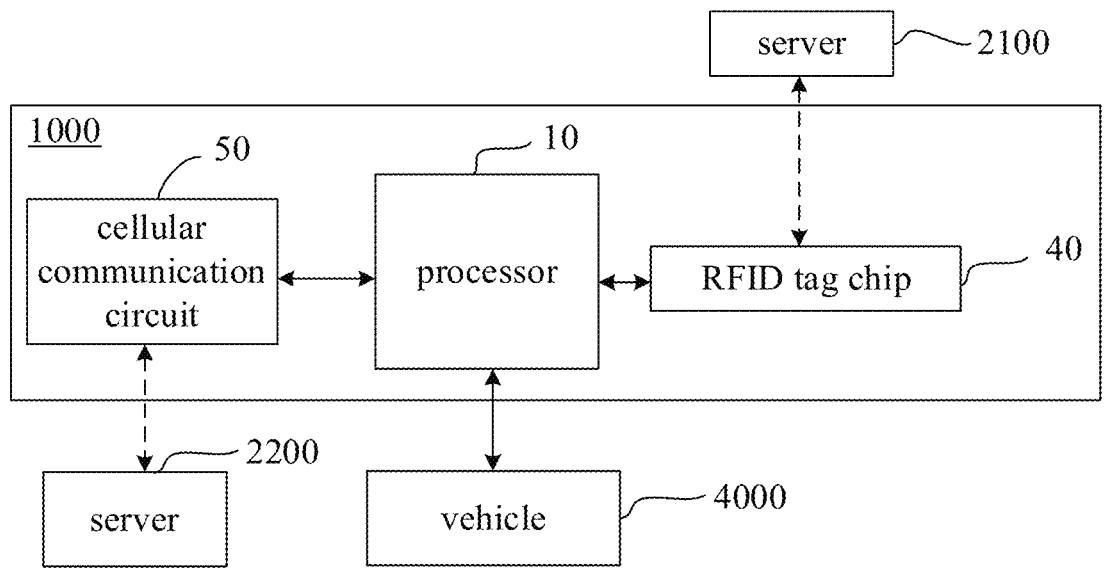
FIG. 2 illustrates a schematic structural diagram of an electronic tag device according to an embodiment of the disclosure.

In an illustrated embodiment, as shown in FIG. 2, the electronic tag device 1000 further includes: a cellular communication circuit 50. The cellular communication circuit 50 is connected to the processor 10 and configured to wirelessly connect a server 2200. The processor 10 is further configured to transmit the current load information to the cellular communication circuit 50 to thereby allow the server 2200 to obtain the current load information from the cellular communication circuit 50.

At present, the logistics companies cannot monitor and control the vehicles such as the trucks transporting goods in real time, which is not conducive to the management of the trucks by the logistics companies.

Based on this, in the embodiment, the processor 10 transmits the current load information of the vehicle 4000 to the cellular communication circuit 50, and the cellular communication circuit 50 transmits the current load information of the vehicle 4000 to the server 2200, thus the logistic company using the server 2200 can obtain the load information of the vehicle 4000 in real-time, so as to monitor and manage the load of the vehicle 4000.

In some embodiments, the cellular communication circuit 50 is further configured to process the current load information to obtain processed current load information, and transmit the processed current load information to the server 2200. Specifically, the cellular communication circuit 50 can perform analog-to-digital conversion and digital-to-analog conversion, in the embodiment, the cellular communication circuit 50 processes the current load information including performing the digital-to-analog conversion on the current load information, so that the processed current load information can be transmitted to the server 2200.

In some embodiments, the cellular communication circuit 50 is configured to receive the current load information of the vehicle 4000, encrypt the current load information of the vehicle 4000, and wirelessly transmit the encrypted current load information of the vehicle 4000 to the server 2200. In addition to the communication function and the signal conversion function, the cellular communication circuit 50 further has the data encryption function, which ensures the security of data transmission.

In some embodiments, the server 2200 is the same as the server 2100, or different from the server 2100. Moreover, in some embodiments, the server 2200 is an independent physical server, a server cluster or distributed system composed of multiple physical servers, or, cloud servers or server clusters that provide cloud services, cloud databases, cloud computing, cloud functions, cloud storage, network services, cloud communications, middleware services, domain name services, security services, content delivery network (CDN), big data, artificial intelligence platforms and other basic cloud computing services. In other embodiments, the server 2200 is a personal server, an enterprise server, or a government server. It should be noted that the disclosure does not limit the type and source of the server 2200.

Figure 3:
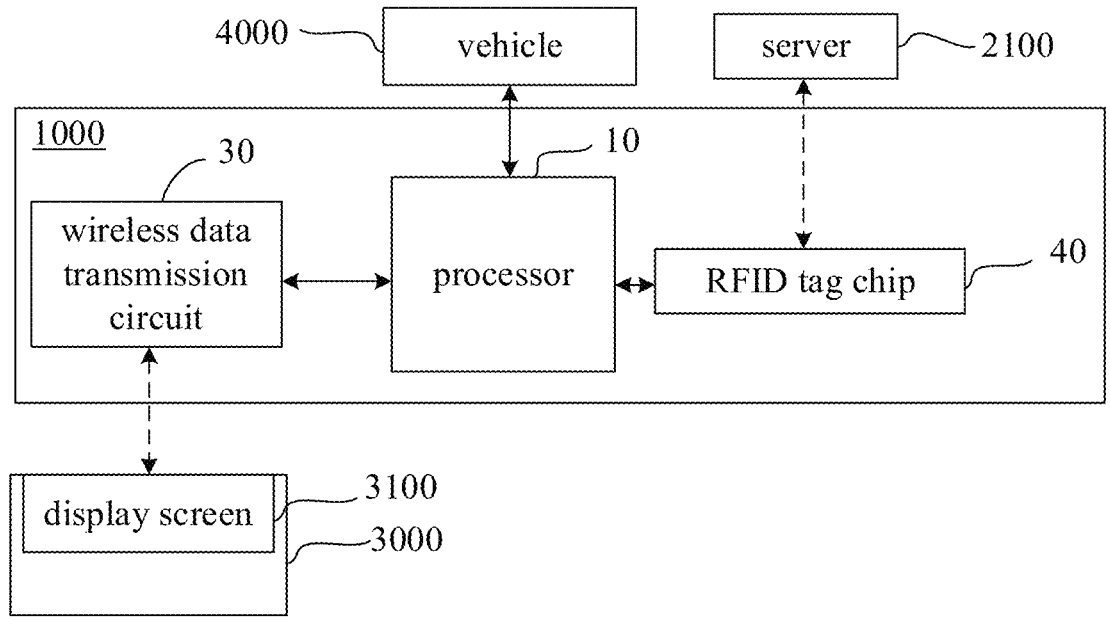
FIG. 3 illustrates a schematic structural diagram of an electronic tag device according to an embodiment of the disclosure.

In an illustrated embodiment, as shown in FIG. 3, the electronic tag device 1000 further includes a wireless data transmission circuit 30. The wireless data transmission circuit 30 is connected to the processor 10 and configured to wirelessly connect an electronic device 3000. The processor 10 is further configured to wirelessly transmit the current load information of the vehicle 4000 to the wireless data transmission circuit 30 to thereby allow the electronic device 3000 to display the current load information of the vehicle 4000.

Before the vehicle passes through the weighing station, the driver usually cannot ascertain the precise load of the vehicle or determine whether the vehicle is exceeding the weight limit. There may be a problem with insufficient loading (i.e., underloading), leaving excess weight in the vehicle, or the vehicle may be found to be overweight only after passing through the weighing station.

Based on this, in the embodiment, the processor 10 transmits the current load information of the vehicle 4000 to the wireless data transmission circuit 30, and the wireless data transmission circuit 30 transmits the current load information of the vehicle 4000 to the electronic device 3000, thus the driver can view the current load information of the vehicle 4000 through the electronic device 3000, so as to avoid the problems of insufficient loading and overweight of the vehicle 4000.

In some embodiments, the wireless data transmission circuit 30 is further configured to process the current load information to obtain processed current load information, and transmit the processed current load information to the electronic device 3000. Specifically, the wireless data transmission circuit 30 can perform analog-to-digital conversion and digital-to-analog conversion, in the embodiment, the wireless data transmission circuit 30 processes the current load information including performing the digital-to-analog conversion on the current load information, so that the processed current load information can be transmitted to the electronic device 3000.

In some embodiments, the wireless data transmission circuit 30 is specifically configured to receive the current load information of the vehicle 4000, encrypt the current load information of the vehicle 4000, and wirelessly transmit the encrypted current load information of the vehicle 4000 to the electronic device 3000. In addition to the communication function and the signal conversion function, the wireless data transmission circuit 30 further has the data encryption function, which ensures the security of data transmission.

Figure 6:
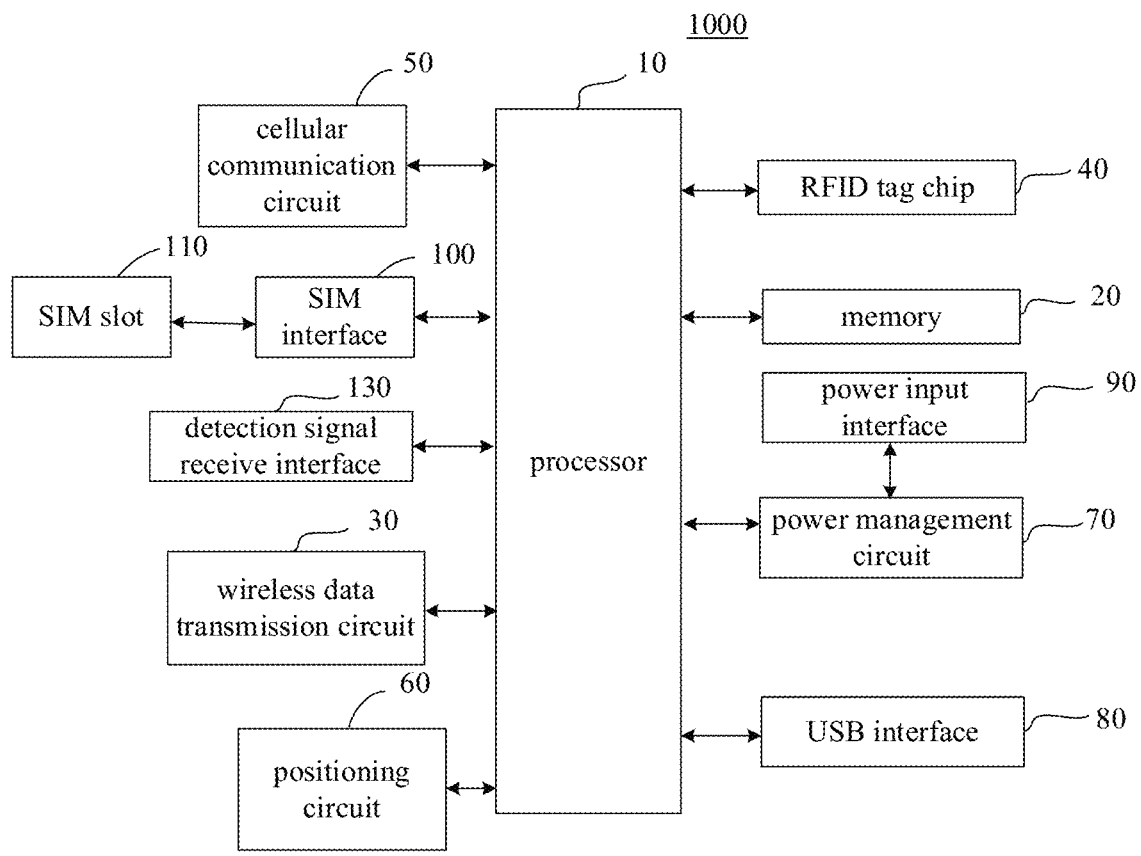
FIG. 6 illustrates a schematic structural diagram of an electronic tag device according to an embodiment of the disclosure.

In some embodiments, as shown in FIG. 6, the electronic tag device 1000 further includes a memory 20 connected to the processor 10. The wireless data transmission circuit 30 is further configured to receive BLUETOOTH® data from the electronic device 3000, convert the BLUETOOTH® data, and transmit the converted BLUETOOTH® data to the processor 10; and the processor 10 is configured to store the converted BLUETOOTH® data into the memory 20. Specifically, in the embodiment, the wireless data transmission circuit 30 converts the BLUETOOTH® data including performing the analog-to-digital conversion on the BLUETOOTH® data, so that the converted BLUETOOTH® data can be transmitted to the processor 10, and stored into the memory 20.

In some embodiments, the wireless data transmission circuit 30 is further configured to receive WIFI data from the electronic device 3000, convert the WIFI data, and transmit the converted WIFI data to the processor 10; and the processor 10 is configured to store the converted WIFI data into the memory 20. Specifically, in the embodiment, the wireless data transmission circuit 30 converts the WIFI data including performing the analog-to-digital conversion on the WIFI data, so that the converted WIFI data can be transmitted to the processor 10, and stored into the memory 20.

In an exemplary embodiment, the wireless data transmission circuit 30 can include: a BLUETOOTH® communication circuit and a WIFI communication circuit, and the BLUETOOTH® communication circuit and the WIFI communication circuit can achieve the above BLUETOOTH® communication function and the above WIFI communication function, respectively. In an embodiment, the electronic device 3000, such as the mobile phone of the user, sends a BLUETOOTH® connection request to the electronic tag device 1000, at this time, the BLUETOOTH® communication circuit of the electronic tag device 1000 is in a request detection state, when the BLUETOOTH® connection request is detected by the BLUETOOTH® communication circuit of the electronic tag device 1000, the BLUETOOTH® communication circuit determines whether to response to this request, after the BLUETOOTH® communication circuit responds to this request, an application (APP) of the mobile phone sends another BLUETOOTH® connection request to a BLUETOOTH® server; the BLUETOOTH® server receives the another BLUETOOTH® connection request and determines whether to allow the connection between the mobile phone and the electronic tag device 1000, when the BLUETOOTH® server allows the connection, the mobile phone can be connected to the electronic tag device 1000 through the BLUETOOTH® communication circuit for bi-directional data transmission. When the BLUETOOTH® server does not allow the connection, the mobile phone determines whether the requests reach three times, if the requests do not reach three times, the mobile phone is disconnected with the BLUETOOTH® server, if the requests reach the three times, the APP sends the BLUETOOTH® connection request to the BLUETOOTH® server again. The aforementioned BLUETOOTH® connection process can be understood as the process of establishing the BLUETOOTH communication between the electronic tag device 1000 and the electronic device 3000 for the first time, in the subsequent BLUETOOTH® communication process, there is no need to establish the BLUETOOTH® connection process again.

Specifically, in some embodiments, as shown in FIG. 3, the electronic device 3000 includes a display screen 3100 displaying information. For example, the electronic device 3000 is a smart phone (such as a phone with the android operating system, a phone with the iPhone operation system (IOS), etc.), a tablet computer, a laptop, a mobile internet device (MID), a desktop computer, a smart appliance, a vehicle-mounted terminal (such as a vehicle navigation terminal, a vehicle computer, etc.), or a smart watch, etc. It should be noted that the disclosure does not limit the specific type of the electronic device 3000. As an example, the electronic device 3000 is the smart phone of a user.

It is worth mentioning that the electronic tag device 1000 disclosed in the disclosure can have the three data transmission modes described above at the same time, thus expanding the application scope of the electronic tag device 1000, that is to say, the electronic tag device 1000 includes the processor 10, the RFID tag chip 40, the cellular communication circuit 50, and the wireless data transmission circuit 30; and the electronic tag device 1000 can output the current load information of the vehicle 4000 through the RFID tag chip 40, the wireless data transmission circuit 30 and the cellular communication circuit 50.

Figure 4:
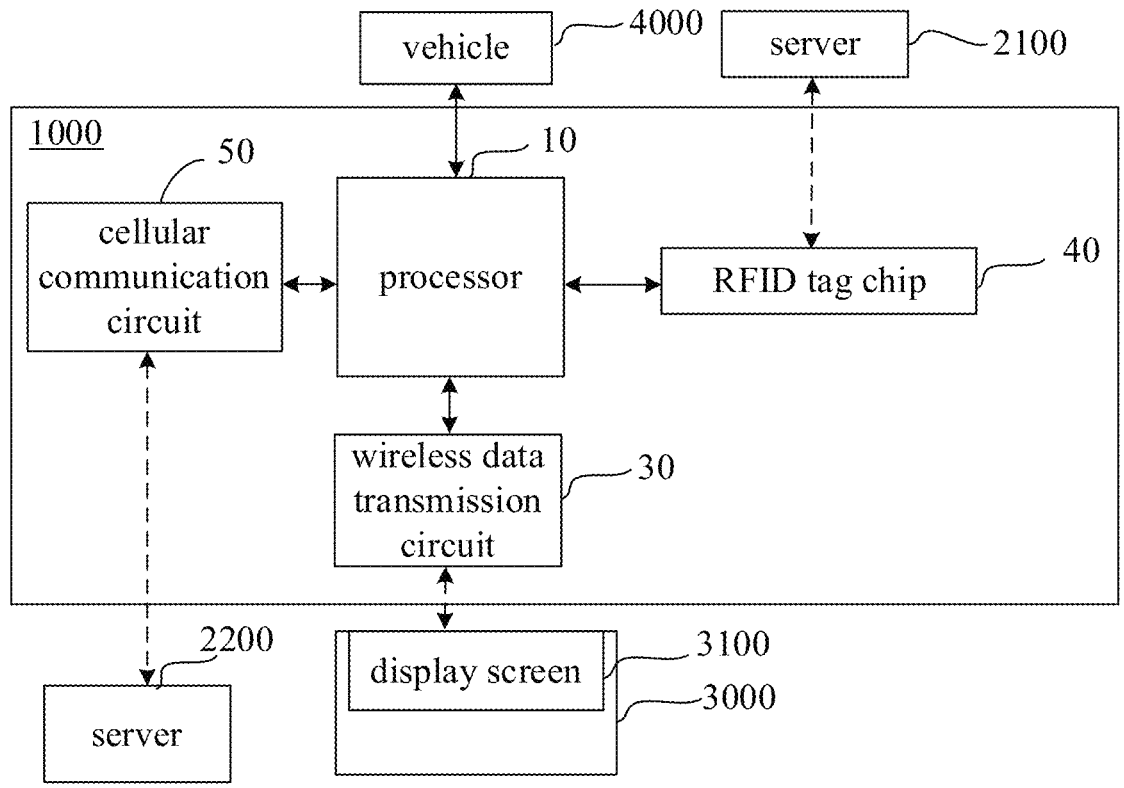
FIG. 4 illustrates a schematic structural diagram of an electronic tag device according to an embodiment of the disclosure.

In an embodiment, on the basis of the illustration of FIG. 1, as shown in FIG. 4, the electronic tag device 1000 further includes: the cellular communication circuit 50 and the wireless data transmission circuit 30. The cellular communication circuit 50 is connected to the processor 10 and configured to wirelessly connect the server 2200, and the wireless data transmission circuit 30 is connected to the processor 10 and configured to wirelessly connect the electronic device 3000.

Specifically, the cellular communication circuit 50 is configured to wirelessly receive an unloading instruction from the server 2200, and transmit the unloading instruction to the processor 10. The processor 10 is configured to obtain an amount of weight to be unloaded according to the unloading instruction, and transmit the amount of weight to be unloaded to the wireless data transmission circuit 30. The wireless data transmission circuit 30 is configured to wirelessly transmit the amount of weight to be unloaded to the electronic device 3000 to thereby enable a user (i.e., the driver) to unload goods corresponding to the amount of weight to be unloaded.

Specifically, the unloading instruction may include the amount of weight to be unloaded. By setting up the cellular communication circuit 50 and the wireless data transmission circuit 30, the logistics company can not only monitor and manage the load of the vehicle in real-time, but also issue instructions to the driver, such as the unloading instruction. Thus, the logistics company can maintain real-time control over the weight of goods. Meanwhile, the driver can receive the amount of weight to be loaded through the electronic device 3000, thereby ensuring a correct amount of the goods is unloaded. Therefore, it facilitates monitoring and management of the goods transportation process by the logistics company.

Figure 5:
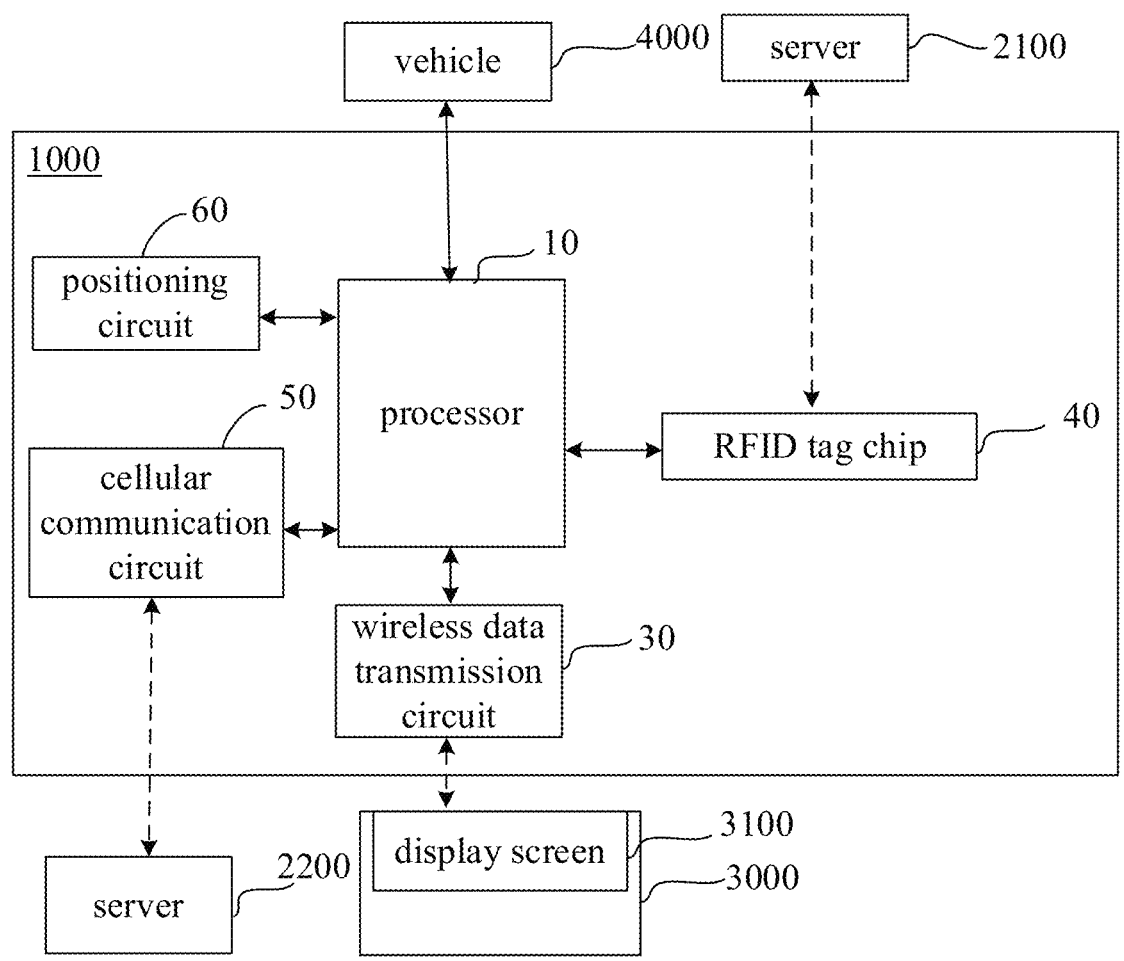
FIG. 5 illustrates a schematic structural diagram of an electronic tag device according to an embodiment of the disclosure.

In an embodiment, as shown in FIG. 5, the electronic tag device 1000 further includes: a positioning circuit 60. The positioning circuit 60 is connected to the cellular communication circuit 50 and configured to obtain current positional data of the electronic tag device 1000 and transmit the current positional data to the cellular communication circuit 50. The cellular communication circuit 50 is further configured to receive the current positional data, wirelessly transmit the current positional data to the server 2200 to thereby enable the server 2200 to output the unloading instruction in response to a current geographical region where the electronic tag device 1000 is located determined by the current positional data being a target delivery point.

Specifically, the target delivery point may be a specific position that the goods need to be unloaded. For example, the target delivery point may be a location of a customer, where the driver is required to unload a set amount of the goods; the target delivery point may also be a logistics transfer station, where goods are consolidated and transported to different places; furthermore, the target delivery point may be a warehouse belonging to the driver's company, where the goods are stored. It should be noted that the disclosure does not specifically limit the target delivery point, which can be set according to the actual situation.

In addition, through setting up the positioning circuit 60, the logistics company can obtain the current geographical region where the vehicle 4000 is located, and determine whether the vehicle 4000 has arrived at the target delivery point based on the current geographical region, so that the logistics company can issue different unloading instructions according to different delivery points, so as to effectively monitor and manage the entire transportation process of the goods.

In an embodiment, after the user unloads the goods corresponding to the amount of weight to be unloaded, the processor 10 is further configured to acquire updated detection signals from the vehicle 4000, process the updated detection signals to obtain updated load information of the vehicle 4000, and convert a data format of the updated load information of the vehicle 4000 to obtain updated load information meeting ISO18000-6C of the vehicle 40000. The RFID tag chip 40 is further configured to obtain and store the updated load information meeting ISO18000-6C of the vehicle 4000 from the processor 10 to thereby allow the server 2100 to obtain the updated load information meeting ISO18000-6C of the vehicle 4000 from the RFID tag chip 40.

Specifically, when the user unloads the goods corresponding to the amount of weight to be unloaded, the current load information of the vehicle 4000 needs to be updated to obtain new load information of the vehicle 4000. At this time, the processor 10 acquires updated detection signals from the vehicle 4000, processes the updated detection signals to obtain the new load information of the vehicle 4000, and converts a data format of the new load information of the vehicle 4000 to obtain new load information meeting ISO18000-6C of the vehicle 40000. The RFID tag chip 40 obtains and stores the new load information meeting ISO18000-6C of the vehicle 4000 from the processor 10, thus the server 2100 can obtain the new load information meeting ISO18000-6C of the vehicle 4000 through scanning the RFID tag chip 40. Thus, the load information of the vehicle 4000 is updated, the logistics company can obtain the new load information of the vehicle 4000 transmitted from the cellular communication circuit 50 through the server 2200, the user can obtain the new load information of the vehicle 4000 transmitted from the wireless data transmission circuit 30 through the electronic device 3000, so as to ensure that the load information of the vehicle 4000 obtained by the server 2100, the server 2200 and the electronic device 3000 is the latest load information of the vehicle 4000, achieving the real-time update of the loading information of the vehicle 4000.

In addition to the aforementioned scheme that the server 2100 sends the unloading instruction in response to the arrival of the vehicle 4000 at the target delivery point, the server 2100 can also send the location information of the target delivery point to the electronic device 3000 in the application. In another illustrated embodiment, the cellular communication circuit 50 is configured to wirelessly receive an unloading instruction from the server 2200, and transmit the unloading instruction to the processor 10. The processor 10 is configured to receive the unloading instruction from the cellular communication circuit 50 to obtain an amount of weight to be unloaded and positional data of a delivery point, and transmit the amount of weight to be unloaded and the positional data of the delivery point to the wireless data transmission circuit 30. The wireless data transmission circuit 30 is configured to wirelessly transmit the amount of weight to be unloaded and the positional data of the delivery point to the electronic device 3000, to thereby enable the user to unload goods corresponding to the amount of weight to be unloaded when the vehicle 4000 arrives the delivery point. In some embodiments, the electronic device 3000 obtains and stores the positional data of the delivery point, when the electronic device 3000 monitors the arrival of the vehicle at the delivery point, it displays a prompt message to the driver.

Specifically, the unloading instruction may include the amount of weight to be unloaded and the positional data of the delivery point. The logistics company can issue the unloading instruction to the driver in advance; thus, the diver can directly drive the vehicle to the target delivery point, and unload the goods corresponding to the amount of weight to be unloaded. So that the driver does not need to wait for the unloading instruction from the logistics company and can directly view the weight of the goods to be unloaded at the target delivery point through the electronic device, which is convenient for the driver and the logistics company.

Figure 7:
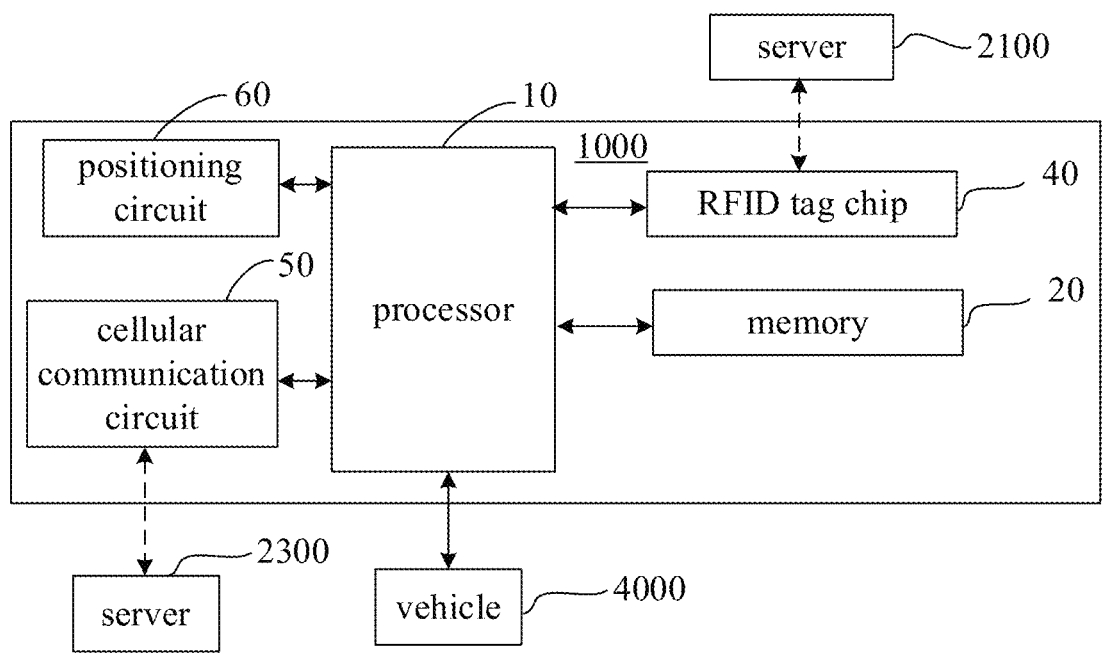
FIG. 7 illustrates a schematic structural diagram of an electronic tag device according to an embodiment of the disclosure.

In an illustrated embodiment, on the basis of the illustration of FIG. 1, as shown in FIG. 7, the electronic tag device 1000 further includes: the cellular communication circuit 50, the memory 20 and the positioning circuit 60. The cellular communication circuit 50 is connected to the processor 10 and configured to wirelessly connect a server 2300, the memory 20 is connected to the processor 10 and configured to store multiple sets of tag data corresponding to different geographic regions, and the positioning circuit 60 is connected to the cellular communication circuit 50.

Specifically, the positioning circuit 60 is configured to obtain current positional data of the electronic tag device 1000 and transmit the current positional data to the cellular communication circuit 50. The cellular communication circuit 50 is configured to receive the current positional data, wirelessly transmit the current positional data to the server 2300 to thereby enable the server 2300 to output a tag data updating instruction in response to a current geographical region where the electronic tag device 1000 is located determined by the current positional data is different from a previously determined geographical region, wirelessly receive the tag data updating instruction from the server 2300, and transmit the tag data updating instruction to the processor 10. The processor 10 is further configured to obtain a target set of tag data corresponding to the tag data updating instruction from the multiple sets of tag data stored in the memory 20 and transmit the target set of tag data to the RFID tag chip 40 for tag data updating.

Specifically, in an embodiment, each set of the multiple sets of tag data include: an electronic product code (EPC), and a tag identifier (TID). The TIDs of the multiple sets of tag data include multiple account information corresponding to the different geographical regions, respectively. For example, the different geographical regions are different administrative regions, such as different states in the USA. The TID of the target set of tag data, for example, includes one of the multiple account information corresponding to the current geographical region being one of the different geographical regions.

Specifically, the multiple account information corresponding to different geographical regions can be understood as that the user registers accounts in the different geographical regions respectively to store the multiple account information of the geographical regions in the memory 20.

At present, a non-stop electronic toll collection system is an advanced road toll collection system. By installing an electronic tag device on a vehicle, when the vehicle is approaching a toll station, the electronic tag device and the toll station wirelessly communicate with each other, and then the vehicle can be recorded for subsequent toll settlement. However, in the U.S.A, the vehicle traveling across different geographical regions, such as the vehicle traveling across different states in the U.S.A, will encounter an additional expense for toll settlement in case of the electronic tag device of the vehicle bound with only one account information, which has a great impact on some industries, such as the automobile leasing industry. Generally, the automobile leasing is carried out at a fixed fee. When a leaseholder drives the vehicle across the different states, the vehicle will encounter the additional expense, which need to be borne by the automobile leasing company itself. In this way, the revenue and development of the automobile leasing company will be greatly affected. For example, an automobile leasing company registers an account for an electronic tag device in New Mexico, the electronic tag device stores account information corresponding to New Mexico, the automobile e.g., car disposed with the electronic tag device will not encounter the additional expense when being driven in New Mexico. However, when a leaseholder drives the car from New Mexico to Texas, in addition to a road toll, the car will encounter an additional expense when the car enters Texas caused by the electronic tag device of the car being bound with only the account information corresponding to the New Mexico, the additional expense can be understood as a handling fee incurred due to crossing different states, which greatly limits the development of the automobile leasing industry.

The electronic tag device 1000 is disposed on the vehicle 4000, which can avoid the above additional expense. Specifically, the memory 20 stores the multiple sets of tag data corresponding to different geographical regions respectively, the positioning circuit 60 obtains the current positional data of the electronic tag device 1000 in real time or periodically, i.e., the positioning circuit 60 obtains the current positional data of the vehicle and transmits the current positional data to the cellular communication circuit 50, the cellular communication circuit 50 outputs the current positional data to the server 2300 to enable the server 2300 to output the tag data updating instruction when the geographical region, where the electronic tag device 1000 is located, changes, i.e., when the vehicle travels cross the different geographical regions, the cellular communication circuit 50 receives the tag data updating instruction from the server 2300 and transmits the tag data updating instruction to the processor 10, the processor 10 obtains the target set of tag data corresponding to the tag data updating instruction from the multiple sets of tag data and transmits the target set of tag data to the RFID tag chip 40, the RFID tag chip 40 updates a previous set of tag data to the target set of tag data to complete tag data updating. Therefore, when the vehicle 4000 is driven across the different geographical regions, no additional expense is incurred because non-local tag data (i.e., the previous set of tag data) has been replaced by local tag data (i.e., the target set of tag data). The electronic tag device 1000 provided by the embodiment disposed on the vehicle can save the additional expense for toll settlement caused by the existing electronic tag device of the vehicle being bound with only one account information, and it is conducive to the development of the car leasing industry.

In an illustrated embodiment, the previously determined geographical region refers to a geographical region determined by immediately previous positional data, i.e., the previously determined geographical region is an immediately previous determined geographical region. The current geographical region where the electronic tag device 1000 is located determined by the current positional data is different from the previously determined geographical region, which can be understood that the geographical region, where the electronic tag device 1000 is located, changes, i.e., the current positional data is not within a data range of the previously determined geographical region and is within a data range of the current geographical region.

For example, when the RFID tag chip 40 of the electronic tag device 1000 stores the account information of the geographical region A, when a vehicle installed with the electronic tag device 1000 is driven in the geographical region A, as the RFID tag chip 40 stores local tag data of the geographical region A, no additional cost is incurred. When the vehicle is driven from the geographical regions A to B, the RFID tag chip 40 of the electronic tag device 1000 can update the account information of the geographical region A to the account information of the geographical region B, at this time, as the RFID tag chip 40 stores local tag data of the geographical region B, and there is no the additional expense.

In an illustrated embodiment, the positioning circuit 60 supports at least one selected from the group consisting of a global positioning system (GPS), a BeiDou navigation satellite system (BDS), a Galileo satellite navigation system (GALILEO) and a GLONASS (i.e., the abbreviation of "global navigation satellite system" in Russian).

Specifically, in some embodiments, the server 2300 is the same as the server 2200, or the server 2300 is different from the server 2200. In some embodiments, at least some of the server 2100, the server 2200 and the server 2300 is the same server, or the server 2100, the server 2200 and the server 2300 are different servers respectively. In some embodiments, the server 2300 is an independent physical server, a server cluster or distributed system composed of multiple physical servers, or, cloud servers or server clusters that provide cloud services, cloud databases, cloud computing, cloud functions, cloud storage, network services, cloud communications, middleware services, domain name services, security services, CDN, big data, artificial intelligence platforms and other basic cloud computing services. For another example, the server 2300 is a personal server, an enterprise server, or a government server. It should be noted that the disclosure does not limit the type and source of the server 2300.

Figure 8:
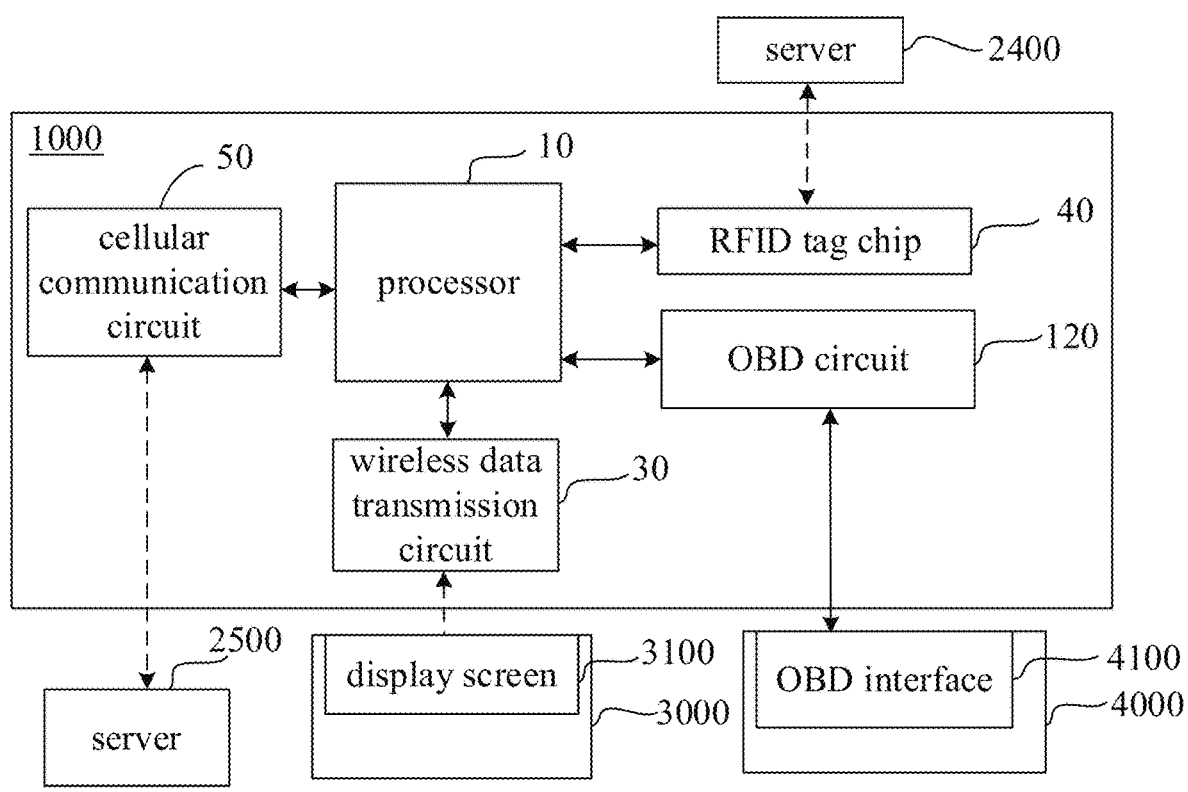
FIG. 8 illustrates a schematic structural diagram of an electronic tag device according to an embodiment of the disclosure.

In an illustrated embodiment, on the basis of the illustration of FIG. 1, as shown in FIG. 8, the electronic tag device 1000 further includes: an OBD circuit 120. The OBD circuit 120 is connected to the processor 10.

Specifically, the processor 10 is configured to transmit an OBD data request command set to an OBD interface 4100 of the vehicle 4000 through the OBD circuit 120 to thereby enable the vehicle 4000 to output OBD data in response to the OBD data request command set. The processor 10 is further configured to obtain target OBD data based on the OBD data obtained from the OBD interface 4100 through the OBD circuit 120 and convert a data format of the target OBD data to obtain the converted target OBD data meeting ISO18000-6C. The RFID tag chip 40 is configured to obtain and store the converted target OBD data meeting ISO18000-6C from the processor 10 to thereby allow a server 2400 to obtain the converted target OBD data meeting ISO18000-6C from the RFID tag chip 40.

Specifically, in some embodiments, the OBD data request command set is predetermined by a user. For example, the OBD data request command set includes at least one OBD data request command, and each the OBD data request command corresponds to at least one OBD data. For another example, the user presets a plurality of OBD data request commands and stores them in a memory, and then the user selects at least one OBD data request command from the plurality of OBD data request commands to form the OBD data request command set to be output through the processor 10. For still another example, the user presets a plurality of OBD data request command sets and stores them in a memory, and then the user selects the required OBD data request command set from the plurality of OBD data request command sets and outputs through the processor 10. For even still another example, the user controls the processor 10 to generate the OBD data request command set in real time.

In some embodiments, the OBD data include: vehicle basic parameters, vehicle exhaust emission parameters, vehicle fault diagnosis data, and vehicle control data. In an embodiment, the vehicle basic parameters include: current data of powertrain, vehicle identification number (VIN), and calibration identification number (CID). In an embodiment, the vehicle exhaust emission parameters include: oxygen sensor test data, catalyst test data, and variable valve timing (VVT) test data. In an embodiment, the vehicle fault diagnosis data include: freeze frame data, and confirmed diagnostic trouble code (DTC). In an embodiment, the current data of powertrain include, but be not limited to, engine coolant temperature, fuel control system status, fuel correction, ignition timing advance, intake air temperature, manifold air pressure, air flow, engine speed, throttle position sensor output values, secondary air status, calculated load value, vehicle speed, and fuel pressure. In an embodiment, the freeze frame data, i.e., stored engine status data at the time of failure, include, but be not limited to, calculated load value, engine speed, fuel correction value, fuel pressure, vehicle speed, coolant temperature, intake branch pipe pressure, closed loop or open loop operation status, and fault codes that cause the above data to be stored. In an embodiment, the OBD data meet the second on-board diagnostics (OBD II) standard.

In an embodiment, the processor 10 is specifically configured to select at least some of the OBD data as the target OBD data. In another embodiment, the processor 10 is specifically configured to calculate the target OBD data based on at least some of the OBD data. The processor 10 can output the OBD data directly as the target OBD data, or calculate the target OBD data based on the OBD data, so as to meet the needs of different OBD data in different scenes.

The OBD circuit 120 of the electronic tag device 1000 can obtain the OBD data of the vehicle 4000, and the processor 10 can obtain the target data based on the OBD data obtained from the vehicle 4000, therefore the electronic tag device 1000 is not only used for the toll collection without stopping, but also can be used in the variety of application scenes because the OBD data can be obtained.

With the global warming, issues related to carbon emissions, mainly carbon dioxide emissions, are increasingly concerned. The amount of carbon dioxide in automobile exhaust gas accounts for nearly a quarter of the total carbon dioxide emission. With the increase of vehicle ownership, the carbon dioxide emissions will also increase, thus it is necessary to detect and monitor the carbon emissions of vehicles, so that the traffic management department or environmental protection department can evaluate the implementation effect of traffic energy conservation and emission reduction measures, or find vehicles with excessive carbon emissions in the traffic system for supervision and management.

Based on this, in an embodiment, the processor 10 of the electronic tag device 1000 converts the target OBD data, the RFID tag chip 40 stores the converted target OBD data meeting ISO18000-6C, and the server 2400 obtains the converted target OBD data meeting ISO18000-6C through the RFID tag chip 40. The server 2400 may be the authenticated ETC server, and the converted target OBD data may include vehicle exhaust data. The authenticated ETC server can obtain the vehicle exhaust data meeting ISO18000-6C from the RFID tag chip 40, it is convenient for relevant departments such as traffic management department or environmental protection department to monitor the carbon emissions of vehicles and thus it is beneficial for the relevant departments to manage vehicles. As a result, the traffic management department or environmental protection department can evaluate the implementation effect of traffic energy conservation and emission reduction measures, and find out vehicles with excessive carbon emissions in the traffic system for supervision and management.

In addition, at present, there is a problem that automobile drivers e.g., truck drivers steal gasoline in logistics companies. That is, after driving out, truck drivers will stop halfway to steal gasoline from trucks. Because logistics companies have no way to monitor the use of gasoline, they cannot judge whether truck drivers steal gasoline, which leads to an increase in the company's operating costs.

Based on this, in an embodiment, the target OBD data include the vehicle basic parameters such as a fuel consumption, a driving distance, an odometer data, and a fuel tank level. When the truck driver drives the truck disposed with the electronic tag device, the logistics company can know the driving conditions of the truck, and thus it can determine whether the truck driver steal gasoline, thereby avoiding the problem of the truck driver stealing gasoline, and the transportation cost of the logistics company can be reduced.

In addition, in an embodiment, the target OBD data include the vehicle fault diagnosis data, vehicle maintenance personnel can directly obtain the vehicle fault diagnosis data for vehicle fault diagnosis and vehicle maintenance, the operation of obtaining data is simple and efficient.

It is noted that, the electronic tag device 1000 is not limited to the above three application scenes, and other scenes where the OBD data needs to be acquired for management and monitoring of the vehicle are applicable to the electronic tag device 1000 provided in the disclosure.

Specifically, in some embodiments, the server 2400 is the same as the server 2100, or the server 2400 is different from the server 2100. In some embodiments, at least some of the server 2100, the server 2200, the server 2300 and the server 2400 is the same server, or the server 2100, the server 2200, the server 2300 and the server 2400 are different servers respectively. In other embodiments, the server 2400 is a personal server, an enterprise server, or a government server. It should be noted that the disclosure does not limit the type and source of the server 2400. In some embodiments, the server 2400 is the authenticated ETC server. It should be noted that the server 2400 obtains the data from the RFID tag chip 40, which can be understood as indirect communication, i.e., a RFID tag reader is disposed on where needed, and the RFID tag reader can obtain the data from the RFID tag chip 40 and sends it to the server 2400.

In an illustrated embodiment, as shown in FIG. 8, The cellular communication circuit 50 is connected to the processor 10 and configured to wirelessly connect a server 2500. The processor 10 is further configured to obtain target OBD data based on the OBD data obtained from the OBD interface 4100 through the OBD circuit 120, and transmit the target OBD data to the cellular communication circuit 50 to thereby allow the server 2500 to obtain the target OBD data from the cellular communication circuit 50.

In some embodiments, the processor 10 is specifically configured to select at least some of the OBD data as the target OBD data, or the processor 10 is specifically configured to calculate the target OBD data based on at least some of the OBD data.

In some embodiments, the processor 10 outputs different target OBD data to the RFID tag chip 40 and the cellular communication circuit 50, that is to say, the processor 10 obtains different target OBD data based on different OBD data, and then outputs the different target OBD data to the RFID tag chip 40 and the cellular communication circuit 50. In other embodiments, the processor 10 outputs the same target OBD data to the RFID tag chip 40 and the cellular communication circuit 50.

Specifically, in some embodiments, the server 2500 is the same as the server 2200, or the server 2500 is different from the server 2200. In some embodiments, at least some of the server 2100, the server 2200, the server 2300, the server 2400 and the server 2500 is the same server, or the server 2100, the server 2200, the server 2300, the server 2400 and the server 2500 are different servers respectively. In some embodiments, the server 2500 is an independent physical server, a server cluster or distributed system composed of multiple physical servers, or, cloud servers or server clusters that provide cloud services, cloud databases, cloud computing, cloud functions, cloud storage, network services, cloud communications, middleware services, domain name services, security services, CDN, big data, artificial intelligence platforms and other basic cloud computing services. For another example, the server 2500 is a personal server, an enterprise server, or a government server. It should be noted that the disclosure does not limit the type and source of the server 2500.

In an illustrated embodiment, as shown in FIG. 8, The wireless data transmission circuit 30 is connected to the processor 10 and configured to wirelessly connect the electronic device 3000. The processor 10 is further configured to obtain target OBD data based on the OBD data obtained from the OBD interface 4100 through the OBD circuit 4000, and transmit the target OBD data to the wireless data transmission circuit 30 to thereby allow the electronic device 3000 to obtain the target OBD data from the wireless data transmission circuit 30 and display the target OBD data for user viewing.

In some embodiments, the processor 10 is specifically configured to select at least some of the OBD data as the target OBD data, or the processor 10 is specifically configured to calculate the target OBD data based on at least some of the OBD data.

In some embodiments, the processor 10 outputs different target OBD data to the RFID tag chip 40 and the wireless data transmission circuit 30, that is to say, the processor 10 obtains different target OBD data based on different OBD data, and then outputs different target OBD data to the RFID tag chip 40 and the wireless data transmission circuit 30. In other embodiments, the processor 10 outputs the same target OBD data to the RFID tag chip 40 and the wireless data transmission circuit 30.

Figure 9:
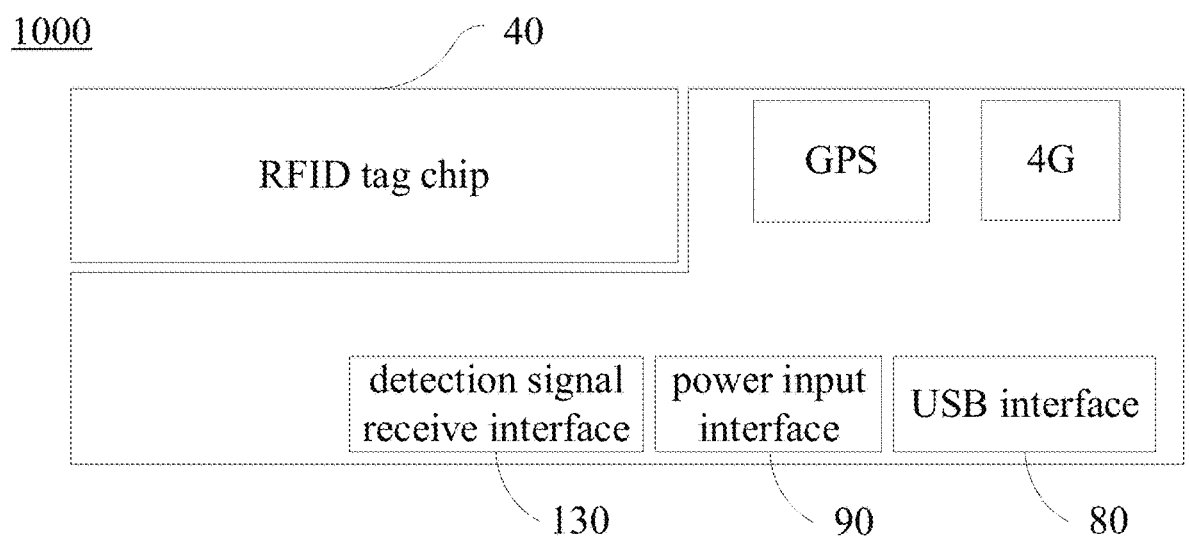
FIG. 9 illustrates a schematic diagram of an electronic tag device according to an embodiment of the disclosure.

In an illustrated embodiment, as shown in FIG. 6, the electronic tag device 1000 further includes: a power management circuit 70, a USB (abbreviation for Universal Serial Bus) interface 80, a detection signal receive interface 130 and a power input interface 90. The power management circuit 70 is connected to the processor 10. The USB interface 80 is connected to the processor 10 and configured to connect a power supply, such as an in-vehicle power supply. The detection signal receive interface 130 is connected to the processor 10 and configured to receive the detection signals from the vehicle 4000. The power input interface 90 is connected to the power management circuit 70 and configured to connect a power supply, such as the in-vehicle power supply. In an embodiment, as shown in FIG. 9, the detection signal receive interface 130, the power input interface 90 and the USB interface 80 are located at a same side of the electronic tag device 1000. Specifically, the detection signal receive interface 130 can be a universal asynchronous receiver/transmitter (UART) interface.

In some embodiments, as shown in FIG. 9, the RFID chip 40 and the other circuits are disposed on different printed circuit boards (PCB). In some embodiments, the RFID tag chip 40 and the other circuits are disposed on a same PCB. It should be noted that the disclosure does not limit the settings of the RFID tag chip 40 and the other circuits, which can be set according to the actual situation.

Furthermore, the electronic tag device 1000 may include a peripheral interface(s) including at least one of a general purpose input (GPI) interface, a UART interface, an I2C (abbreviation for inter-integrated circuit) interface, and a dynamic random access memory (DRAM) interface. The disclosure does not limit the specific types of the peripheral interface, which can be set according to the actual situation.

In an illustrated embodiment, as shown in FIG. 6, the electronic tag device 1000 further includes: a SIM interface 100 connected to the processor 10 and configured to receive SIM signals; and a SIM slot 110 is connected to the SIM interface 100 and configured to transmit the SIM signals. In some embodiments, a SIM card may be disposed in the SIM slot 110, and the SIM card may be a 4th generation communication system (4G) long term evolution (LTE) nano SIM card or other type cards such as 3G SIM card.

In an illustrated embodiment, the wireless data transmission circuit 30 and the positioning circuit 60 are integrated in a single chip, for example, a wireless data transmission and positioning chip 1100. The wireless data transmission and positioning chip 1100 may be a chip with a model of MT6625L.

In order to facilitate the understanding of the disclosure, the electronic tag device 1000 provided in the disclosure is described below in combination with the accompanying drawings.

The electronic tag device 1000 can communicate with at least one server, such as the server 2100, the server 2200, the server 2300, the sever 2400 and/or the server 2500, and the electronic device 3000.

Figure 10:
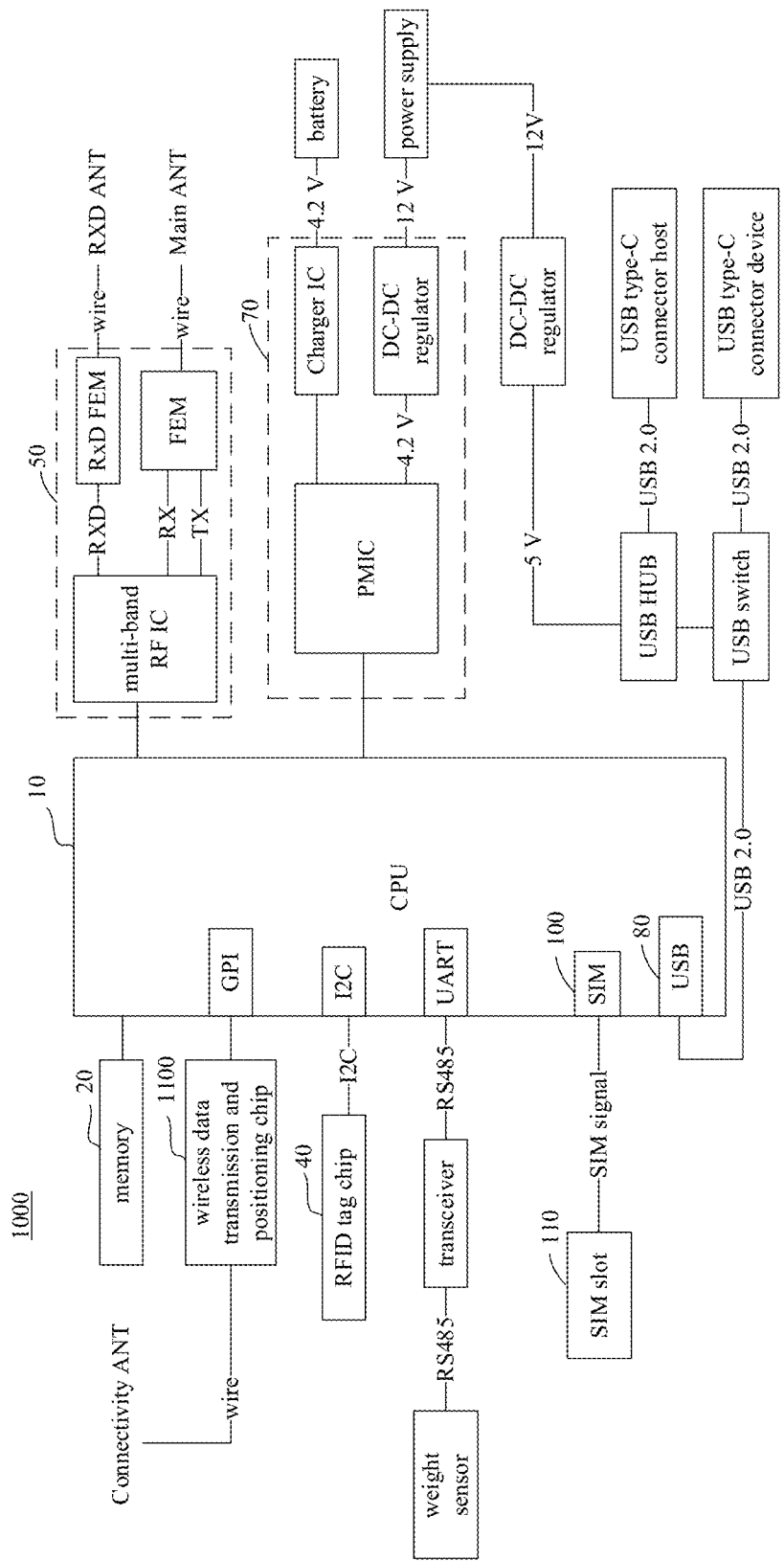
FIG. 10 illustrates a schematic structural diagram of an electronic tag device according to an embodiment of the disclosure.

As shown in FIGS. 10, the electronic tag device 1000 exemplarily includes the processor 10, the RFID tag chip 40 connected to the processor 10, the cellular communication circuit 50 connected to the processor 10, the wireless data transmission and positioning chip 1100 connected to the processor 10, the memory 20 connected to the processor 10, and the power management circuit 70 connected to the processor 10.

In an illustrated embodiment, as shown in FIG. 10, the cellular communication circuit 50 includes a multi-band RF integrated circuit (IC). Specifically, for example, the multi-band RF IC may be a chip with a model of MT6177M. The cellular communication circuit 50 further includes a receive diversity (RXD) front end module (FEM) and a FEM. The RXD FEM is connected to the multi-band RF IC via a RXD bus, and the FEM is connected to the multi-band RF IC via a receive (RX) bus and a transmit (TX) bus. The RXD FEM is configured to connect an RXD antenna and receive data, and the FEM is configured to connect a main antenna, and receive and transmit data.

In an illustrated embodiment, as shown in FIG. 10, the power management circuit 70 includes a power management integrated circuit (PMIC), and PMIC is a chip with a model of MT6357. The power management circuit 70 further includes a charger integrated circuit (IC) and a direct current-direct current (DC-DC) regulator. Specifically, the charger IC is configured to connect a battery to obtain a power, the power is, for example, 4.2 V, and the DC-DC regulator is configured to connect a power supply to obtain a power, the power is, for example, 12V, and regulate a voltage of the power, for example, regulating the voltage of the power from 12 V to 4.2 V.

In an illustrated embodiment, as shown in FIG. 10, the USB interface 80 may be USB 2.0, the USB interface 80 is configured to connect the power supply such as the in-vehicle power supply to obtain a power, the power is, for example, 12V. The USB interface 80 can communicate with a personal computer (PC). Specifically, the USB interface 80 is connected to a USB switch via a USB bus, and the USB switch is connected to a USB type-C connector device via a USB bus. The USB switch is further connected to a USB HUB, the USB HUB is connected to a USB type-C connector host via a USB bus, and the USB type-C connector host is configured to connect and control multiple devices, that is, the USB type-C connector host makes the USB interface 80 work in the host mode, and the USB type-C connector device makes the USB interface 80 work in the device mode. In some embodiments, the USB HUB is connected to a DC-DC regulator, and the DC-DC regulator is configured to connect the power supply to obtain a power, and regulate the input voltage, for example, regulating the input voltage from 12 V to 5V. The DC-DC regulator makes the USB interface 80 obtain the power or output the power.

In an illustrated embodiment, as shown in FIG. 10, the detection signal receive interface 130 may be the UART interface, the UART interface is configured to connect a transceiver through the RS485 cable, and the transceiver is configured to connect multiple weight sensors. Specifically, a model of the transceiver is SP3485. The processor 10 is provided with the UART interface, the SIM interface 100 and the USB interface 80. The wireless data transmission and positioning chip 1100 is provided with the wireless data transmission circuit 30 and the positioning circuit 60.

In an embodiment, the processor 10 is connected to the RFID tag chip 40 via an I2C bus.

Specifically, as shown in FIG. 10, when the electronic tag device 1000 is working, the power supply (i.e., the battery or the in-vehicle power supply) provides power to the electronic tag device 1000 through the power input interface 90 or the USB interface 80. The multiple weight sensors acquire multiple detection signals of the vehicle 4000, and transmit the multiple detection signals of the vehicle 4000 to the transceiver through the RS485 cable. The transceiver collects the multiple detection signals of the vehicle 4000 from the weight sensors, and transmits the multiple detection signals of the vehicle 4000 to the processor 10 through the RS485 cable. The processor 10 obtains the detection signals of the vehicle 4000 from the transceiver, calculate the current load information of the vehicle 4000 based on the detection signals by using the math model.

After the processor 10 obtains the current load information, the electronic tag device 1000 provides three data output modes.

In a first data output mode, the processor 10 converts the current load information of the vehicle 4000 to the converted load information meeting ISO18000-6C of the vehicle 4000, and then transmits the converted load information to the RFID tag chip 40 through the I2C interface. When the server 2100 such as the authenticated server by the FHWA and the state DOT communicates with the RFID tag chip 40, the RFID tag chip 40 can output the converted load information meeting ISO18000-6C of the vehicle 4000 to the authenticated server.

In a second data output mode, the processor 10 transmits the current load information to the cellular communication circuit 50, when the server 2200 such as the authenticated server communicates with the cellular communication circuit 50, the cellular communication circuit 50 can process the current load information to obtain processed current load information and then output the processed load information to the authenticated server.

In a third data output mode, the processor 10 transmits the current load information to the wireless data transmission and positioning chip 1100, when the electronic device 3000 such as the mobile phone communicates with the wireless data transmission and positioning chip 1100, for example, the mobile phone request to obtain the current load information, the wireless data transmission and positioning chip 1100 can process the current load information to obtain processed current load information, and then output the processed load information to the mobile phone.

In an embodiment, the cellular communication circuit 50 wirelessly receives an unloading instruction from the authenticated server, and transmits the unloading instruction to the processor 10. For example, the RXD FEM and/or the FEM can receive the unloading instruction from the authenticated server, and transmit the unloading instruction to the processor 10 through the multiple-band RF IC. In an embodiment, the unloading instruction may include the amount of weight to be unloaded. The processor 10 obtains the amount of weight to be unloaded according to the unloading instruction, and transmits the amount of weight to be unloaded to the wireless data transmission and positioning chip 1100. The wireless data transmission and positioning chip 1100 wirelessly transmits the amount of weight to be unloaded to the mobile phone to thereby enable the driver to unload goods corresponding to the amount of weight to be unloaded.

Furthermore, the wireless data transmission and positioning chip 1100 obtains the current positional data of the electronic tag device 1000 and transmits the current positional data to the cellular communication circuit 50. The cellular communication circuit 50 receives the current positional data, wirelessly transmits the current positional data to the authenticated server to thereby enable the authenticated server to output the unloading instruction in response to the current geographical region where the electronic tag device 1000 is located determined by the current positional data being the target delivery point. For example, the wireless data transmission and positioning chip 1100 transmits the current positional data to the processor 10, and the processor 10 transmits the current positional data to the multiple-band RF IC, the multiple-band RF IC transmits the current positional data to the authenticated server through the FEM.

In another embodiment, the cellular communication circuit 50 wirelessly receives an unloading instruction from the authenticated server, and transmit the unloading instruction to the processor 10. For example, the RXD FEM and/or the FEM can receive the unloading instruction from the authenticated server, and transmit the unloading instruction to the processor 10 through the multiple-band RF IC. Specifically, the unloading instruction may include the amount of weight to be unloaded and the position data. The processor 10 receives the unloading instruction from the cellular communication circuit 50 to thereby obtain the amount of weight to be unloaded and the positional data of a delivery point, and transmits the amount of weight to be unloaded and the positional data of the delivery point to the wireless data transmission and positioning chip 1100. The wireless data transmission and positioning chip 1100 wirelessly transmits the amount of weight to be unloaded and the positional data of the delivery point to the smart phone, to thereby enable the driver to unload the goods corresponding to the amount of weight to be unloaded when the vehicle 4000 arrives the delivery point.

After the driver unloads the goods corresponding to the amount of weight to be unloaded, the current load information of the vehicle 4000 is updated to obtain new load information. Specifically, the weight sensors acquire updated detection signals of the vehicle 4000, and transmits the updated detection signals to the transceiver. The transceiver collects the updated detection signals from the weight sensors, and transmits the updated detection signals to the processor 10 through the UART interface. The processor 10 obtains the updated detection signals from the transceiver, and calculates the new load information of the vehicle 4000 based on the updated detection signals by using the math model. Then, the electronic tag device 1000 outputs the new load information meeting ISO18000-6C of the vehicle 4000 through the RFID tag chip 40, and the new load information of the vehicle 4000 through the wireless data transmission and positioning chip 1100 and the cellular communication circuit 50.

To sum up, in the disclosure, the electronic tag device 1000 is provided, and the processor 10 of the electronic tag device 1000 can acquire the detection signals of the vehicle 4000, and process the detection signals to obtain the current load information of the vehicle 4000. Thus, the electronic tag device 1000 of the disclosure can obtain the load of the vehicle 4000 in real time or periodically, which greatly facilitates the monitoring and management of the transportation process of goods.

Specifically, the processor 10 of the electronic tag device 1000 can convert the data format of the current load information of the vehicle 4000 to obtain converted load information meeting ISO18000-6C of the vehicle 4000, the RFID tag chip 40 can obtain and store the converted load information meeting ISO18000-6C of the vehicle 4000 from the processor 10, the server 2100 can obtain the converted load information meeting ISO18000-6C of the vehicle 4000, the server 2100 may be the authenticated server by the FHWA and the state DOT. The authenticated server can obtain the converted load information meeting ISO18000-6C of the vehicle 4000 based on the RFID tag chip 40, so that the relevant departments such as FHWA and the state DOT can quickly and accurately obtain the load information of the vehicle 4000 to check whether the vehicle 4000 is overweight in time, thus effectively avoiding the overload vehicle driving on the highway, reducing the damage to the road and reducing the risk of traffic accidents, and improving efficiency of vehicle transportation and management. Meanwhile. truck drivers no longer need to drive trucks in line at the weighing station, which significantly reduces the waiting time and improves the transportation efficiency of the goods. Therefore, the electronic tag device 1000 of the disclosure significantly improves the efficiency of vehicle supervision and management by the relevant departments.

Moreover, the processor 10 of the electronic tag device 1000 can wirelessly transmit the current load information of the vehicle 4000 to the server 2200 through the cellular communication circuit 50, and the server 2200 can be the enterprise server. In the logistics company, when a vehicle driver e.g., the truck driver drives the truck disposed with the electronic tag device 1000, the logistics company can monitor and manage the load of the vehicle 4000 in real time, so as to better manage the transportation process of the goods. The electronic tag device 1000 further includes the wireless data transmission circuit 30, and the wireless data transmission circuit 30 is connected to the electronic device 3000, so that the driver can view the relevant information of the vehicle 4000 and receive the instructions sent from the logistics company. For example, the logistics company can send the unloading instruction through the enterprise server, the processor 10 can receive the unloading instruction through the cellular communication circuit 50, obtain the amount of weight to be unloaded according to the unloading instruction, and transmit the amount of weight to be unloaded to the electronic device 3000 through the wireless data transmission circuit 30, so that the driver can know the amount of weight to be unloaded, to thereby unload corresponding weight of the goods. Therefore, the electronic tag device 1000 of the disclosure further optimizes the efficiency of the logistics company in managing goods transportation and reduces operating costs.

In addition, the electronic tag device 1000 is provided with the OBD circuit 120 for connecting the OBD interface 4100 of the vehicle 4000, the OBD circuit 120 of the electronic tag device 1000 can obtain the OBD data from the vehicle 4000, and the processor 10 can obtain the target OBD data based on the OBD data obtained from the vehicle 4000, therefore the electronic tag device 1000 is not only used for the toll collection without stopping, but also can be used in the variety of application scenes because the OBD data can be obtained.

In an application scene, the processor 10 of the electronic tag device 1000 can convert the target OBD data, the RFID tag chip 40 can store the converted target OBD data, the server 2100 can obtain the converted target OBD data through the RFID tag chip 40, the server 2100 may be the authenticated ETC server and the converted target OBD data may include vehicle exhaust data, the authenticated ETC server can obtain the vehicle exhaust data from the RFID tag chip 40, therefore it is convenient for relevant departments such as traffic management department or environmental protection department to monitor the carbon emissions of the vehicles, and it is beneficial for the relevant departments to manage vehicles.

In another application scene, the target OBD data may include vehicle basic parameters such as a fuel consumption, a driving distance, an odometer data, and a fuel tank level; in the logistics company, when the car driver drives the car disposed with the electronic tag device 1000, the logistics company can know driving conditions of the car based on the target OBD data, and thus it can avoid the problem of the car driver stealing fuel such as gasoline on the way, and the transportation cost of the logistics company can be reduced.

In a still another application scene, the target OBD data may include vehicle fault diagnosis data, vehicle maintenance personnel can directly obtain the vehicle fault diagnosis data for vehicle fault diagnosis and vehicle maintenance, the operation of obtaining data is simple and efficient.

The electronic tag device 1000 can obtain the target OBD data based on the OBD data, and output the target OBD data through the RFID tag chip 40, the cellular communication circuit 50 and/or the wireless data transmission circuit 30, thereby to meet actual needs, and the application scope of the electronic tag device 1000 is wider.

Furthermore, the memory 20 of the electronic tag device 1000 can be stored with the multiple sets of tag data corresponding to different geographic regions respectively, the electronic tag device 1000 can acquire the positional data in real time or periodically and transmit the positional data to the server, the server output the tag data updating instruction when it determines that the current geographical region where the electronic tag device 1000 is located determined by the positional data is different from a previously determined geographical region, i.e., the geographical region of the electronic tag device 1000 has changed, the electronic tag device 1000 obtain the target set of tag data corresponding to the tag data updating instruction from the multiple sets of tag data. Therefore, when the electronic tag device 1000 disclosed by the disclosure is disposed on the vehicle, an additional expense for toll settlement caused by an existing electronic tag device of the vehicle being bound with only one account information can be saved. It is conducive to the development of the automobile leasing industry.

The above description is only some of embodiments of the disclosure, which does not limit a scope of protection of the disclosure. Without departing from the spirit and scope of the disclosure, the disclosure will also have various changes and improvements. Under the inventive concept of the disclosure, the equivalent structural substitutions made based on the description and attached drawings of the disclosure, and/or the above described embodiments directly or indirectly applied in other relevant technical fields, should be included in the scope of protection of the disclosure.

What is claimed is:

1. An electronic tag device, comprising:
a processor; and
a radio frequency identification (RFID) tag chip, connected to the processor;
wherein the processor is configured to acquire detection signals in real time or periodically from multiple sensors of a vehicle which are connected with the processor through a RS485 cable and process the detection signals to obtain current load information of the vehicle; and the processor is further configured to convert a data format of the current load information of the vehicle to obtain the converted load information meeting ISO18000-6C of the vehicle; and
wherein the RFID tag chip is configured to obtain and store the converted load information meeting ISO18000-6C of the vehicle from the processor to thereby allow a first server to obtain the converted load information meeting ISO18000-6C of the vehicle from the RFID tag chip.

2. The electronic tag device as claimed in claim 1, further comprising:
a cellular communication circuit, connected to the processor and configured to wirelessly connect a second server;
wherein the processor is configured to transmit the current load information to the cellular communication circuit to thereby allow the second server to obtain the current load information from the cellular communication circuit.

3. The electronic tag device as claimed in claim 2, wherein the cellular communication circuit is further configured to process the current load information to obtain processed current load information, and transmit the processed current load information to the second server.

4. The electronic tag device as claimed in claim 2, wherein the cellular communication circuit is configured to receive the current load information of the vehicle, encrypt the current load information of the vehicle, and wirelessly transmit the encrypted current load information of the vehicle to the second server.

5. The electronic tag device as claimed in claim 4, wherein the wireless data transmission circuit is configured to receive the current load information of the vehicle, encrypt the current load information of the vehicle, and wirelessly transmit the encrypted current load information of the vehicle to the electronic device.

6. The electronic tag device as claimed in claim 2, further comprising:
a memory, connected to the processor and configured to store multiple sets of tag data corresponding to different geographic regions;

a positioning circuit, connected to the cellular communication circuit;

wherein the positioning circuit is configured to obtain current positional data of the electronic tag device and transmit the current positional data to the cellular communication circuit;

wherein the cellular communication circuit is configured to receive the current positional data, wirelessly transmit the current positional data to a third server to thereby enable the third server to output a tag data updating instruction in response to a current geographical region where the electronic tag device is located determined by the current positional data is different from a previously determined geographical region, wirelessly receive the tag data updating instruction from the third server, and transmit the tag data updating instruction to the processor; and wherein the processor is further configured to obtain a target set of tag data corresponding to the tag data updating instruction from the multiple sets of tag data stored in the memory and transmit the target set of tag data to the RFID tag chip for tag data updating.

7. The electronic tag device according to claim 6, wherein each set of the multiple sets of tag data comprises: an electronic product code (EPC) and a tag identifier (TID), and the TIDs of the multiple sets of tag data comprise multiple account information corresponding to the different geographical regions respectively, and the TID of the target set of tag data comprises one of the multiple account information corresponding to the current geographical region being one of the different geographical regions.

8. The electronic tag device as claimed in claim 1, further comprising:

a wireless data transmission circuit, connected to the processor and configured to wirelessly connect an electronic device;

wherein the processor is further configured to wirelessly transmit the current load information of the vehicle to the wireless data transmission circuit to thereby allow the electronic device to display the current load information of the vehicle.

9. The electronic tag device as claimed in claim 8, wherein the wireless data transmission circuit is further configured to process the current load information to obtain processed current load information, and transmit the processed current load information to the electronic device.

10. The electronic tag device as claimed in claim 8, further comprising:

a memory, connected to the processor; and wherein the wireless data transmission circuit is further configured to receive BLUETOOTH® data from the electronic device, convert the BLUETOOTH® data, and transmit the converted BLUETOOTH® data to the processor; and the processor is configured to store the converted BLUETOOTH® data into the memory.

11. The electronic tag device as claimed in claim 8, further comprising:

a memory connected to the processor; and wherein the wireless data transmission circuit is further configured to receive wireless fidelity (WIFI) data from the electronic device, convert the WIFI data, and transmit the converted WIFI data to the processor; and the processor is configured to store the converted WIFI data into the memory.

12. The electronic tag device as claimed in claim 1, further comprising:

a cellular communication circuit, connected to the processor and configured to wirelessly connect a second server; and a wireless data transmission circuit, connected to the processor and configured to wirelessly connect an electronic device;

wherein the cellular communication circuit is configured to wirelessly receive an unloading instruction from the second server, and transmit the unloading instruction to the processor;

wherein the processor is configured to obtain an amount of weight to be unloaded according to the unloading instruction, and transmit the amount of weight to be unloaded to the wireless data transmission circuit; and wherein the wireless data transmission circuit is configured to wirelessly transmit the amount of weight to be unloaded to the electronic device to thereby unload goods corresponding to the amount of weight to be unloaded.

13. The electronic tag device as claimed in claim 12, further comprising:

a positioning circuit, connected to the cellular communication circuit and configured to obtain current positional data of the electronic tag device and transmit the current positional data to the cellular communication circuit; and wherein the cellular communication circuit is further configured to receive the current positional data, wirelessly transmit the current positional data to the second server to thereby enable the second server to output the unloading instruction in response to a current geographical region where the electronic tag device is located determined by the current positional data being a target delivery point.

14. The electronic tag device as claimed in claim 12, wherein after the goods corresponding to the amount of weight to be unloaded are unloaded, the processor is further configured to acquire updated detection signals from the vehicle, process the updated detection signals to obtain updated load information of the vehicle, and convert a data format of the updated load information of the vehicle to obtain updated load information meeting ISO18000-6C of the vehicle; and wherein the RFID tag chip is further configured to obtain and store the updated load information meeting ISO18000-6C of the vehicle from the processor to thereby allow the first server to obtain the updated load information meeting ISO18000-6C of the vehicle from the RFID tag chip.

15. The electronic tag device as claimed in claim 1, further comprising:

a cellular communication circuit, connected to the processor and configured to wirelessly connect a second server; and a wireless data transmission circuit, connected to the processor and configured to wirelessly connect an electronic device;

wherein the cellular communication circuit is configured to wirelessly receive an unloading instruction from the second server, and transmit the unloading instruction to the processor;

wherein the processor is configured to receive the unloading instruction from the cellular communication circuit to obtain an amount of weight to be unloaded and positional data of a delivery point, and transmit the amount of weight to be unloaded and the positional data of the delivery point to the wireless data transmission circuit; and wherein the wireless data transmission circuit is configured to wirelessly transmit the amount of weight to be unloaded and the positional data of the delivery point to the electronic device, to thereby unload goods corresponding to the amount of weight to be unloaded when the vehicle arrives the delivery point.

16. The electronic tag device according to claim 1, further comprising:
a subscriber identity module (SIM) interface, connected to the processor; and
a SIM slot, connected to the SIM interface and configured to connect a SIM card.

17. An electronic tag device, comprising:
a processor;
a RFID tag chip, connected to the processor; and
an on-board diagnostics (OBD) circuit, connected to the processor;
wherein the processor is configured to acquire detection signals from a vehicle and process the detection signals to obtain current load information of the vehicle; and the processor is further configured to convert a data format of the current load information of the vehicle to obtain the converted load information meeting ISO18000-6C of the vehicle;
wherein the RFID tag chip is configured to obtain and store the converted load information meeting ISO18000-6C of the vehicle from the processor to thereby allow a first server to obtain the converted load information meeting ISO18000-6C of the vehicle from the RFID tag chip;
wherein the processor is configured to transmit an OBD data request command set to an OBD interface of the vehicle through the OBD circuit to thereby enable the vehicle to output OBD data in response to the OBD data request command set; and the processor is further configured to obtain first target OBD data based on the OBD data obtained from the OBD interface through the OBD circuit and convert a data format of the first target OBD data to obtain the converted first target OBD data meeting ISO18000-6C; and the OBD data comprises: static data including vehicle identification number (VIN), and dynamic data including at least one of a fuel tank level, odometer data and vehicle exhaust emission parameters;
wherein the RFID tag chip is configured to obtain and store the converted first target OBD data meeting ISO18000-6C from the processor to thereby allow a monitoring server to obtain the converted first target OBD data meeting ISO18000-6C from the RFID tag chip.

18. The electronic tag device according to claim 17, further comprising:

a cellular communication circuit, connected to the processor and configured to wirelessly connect a second server;
wherein the processor is further configured to obtain second target OBD data based on the OBD data obtained from the OBD interface through the OBD circuit, and transmit the second target OBD data to the cellular communication circuit to thereby allow the second server to obtain the second target OBD data from the cellular communication circuit.

19. The electronic tag device according to claim 17, further comprising:
a wireless data transmission circuit, connected to the processor and configured to wirelessly connect an electronic device;
wherein the processor is further configured to obtain third target OBD data based on the OBD data obtained from the OBD interface through the OBD circuit, and transmit the third target OBD data to the wireless data transmission circuit to thereby allow the electronic device to obtain the third target OBD data from the wireless data transmission circuit and display the third target OBD data.

20. An electronic tag device according to claim 1, further, comprising:
a processor;
a RFID tag chip, connected to the processor;
a power management circuit, connected to the processor;
a universal serial bus (USB) interface, connected to the processor and configured to connect a first power supply;
a detection signal receive interface, connected to processor and configured to receive the detection signals from the vehicle; and
a power input interface, connected to the power management circuit and configured to connect a second power supply;
wherein the processor is configured to acquire detection signals from a vehicle and process the detection signals to obtain current load information of the vehicle; and the processor is further configured to convert a data format of the current load information of the vehicle to obtain the converted load information meeting ISO18000-6C of the vehicle; and
wherein the RFID tag chip is configured to obtain and store the converted load information meeting ISO18000-6C of the vehicle from the processor to thereby allow a first server to obtain the converted load information meeting ISO18000-6C of the vehicle from the RFID tag chip; and
wherein the detection signal receive interface, the power input interface and the USB interface are located at a same side of the electronic tag device.

* * * * *